US012693683B2

(12) United States Patent
Robertson et al.

(10) Patent No.: US 12,693,683 B2
(45) Date of Patent: Jul. 28, 2026

(54) AUTOMATED AIRCRAFT RECOVERY SYSTEM

(71) Applicant: Kitty Hawk Corporation, Palo Alto, CA (US)

(72) Inventors: Cameron Robertson, San Mateo, CA (US); Joseph Roop, Sunnyvale, CA (US); Todd Reichert, Mountain View, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 28 days.

(21) Appl. No.: 19/009,707

(22) Filed: Jan. 3, 2025

(65) Prior Publication Data

US 2025/0147507 A1 May 8, 2025

Related U.S. Application Data

(63) Continuation of application No. 18/589,243, filed on Feb. 27, 2024, now Pat. No. 12,222,717, which is a
(Continued)

(51) Int. Cl.
*G05D 1/656* (2024.01)
*B64D 17/54* (2006.01)
(Continued)

(52) U.S. Cl.
CPC ............. *G05D 1/665* (2024.01); *B64D 17/54* (2013.01); *B64D 17/62* (2013.01); *B64D 17/80* (2013.01);
(Continued)

(58) Field of Classification Search
CPC ...... G05D 1/665; G05D 1/042; G05D 1/0808; G05D 1/46; G05D 1/81; B64D 17/54;
(Continued)

(56) References Cited

U.S. PATENT DOCUMENTS

| | | | |
|---|---|---|---|
| 2,352,721 A | 7/1944 | Krahel | |
| 3,051,420 A | 8/1962 | Novak | |

(Continued)

FOREIGN PATENT DOCUMENTS

| | | |
|---|---|---|
| CA | 2324362 | 10/1999 |
| CN | 102381478 | 3/2012 |

(Continued)

OTHER PUBLICATIONS

Cirrus Airplane Maintenance Manual Model SR22 (Apr. 15, 2007), pp. 5-8.

(Continued)

*Primary Examiner* — Thomas E Worden
*Assistant Examiner* — Madison B Emmett
(74) *Attorney, Agent, or Firm* — Van Pelt, Yi & James LLP

(57) ABSTRACT

An indication to perform a recovery action, including by deploying a first and second parachute canopy is output. Sensor data, which includes parachute canopy state information associated with the first parachute canopy and the second parachute canopy, is received from a sensor. It is determined, based at least in part on the sensor data, whether to generate a control signal with a value associated with maneuvering the aircraft into a nose-up position. If the parachute canopy state information indicates the first parachute canopy is collapsed and the second is inflated, the control signal is generated with the value associated with maneuvering the aircraft into the nose-up position. A load on the second parachute canopy is reduced if the aircraft is in the nose-up position compared to the aircraft being in a nose-down position. The control signal is output.

14 Claims, 24 Drawing Sheets

Related U.S. Application Data continuation of application No. 17/558,170, filed on Dec. 21, 2021, now Pat. No. 11,947,352, which is a continuation of application No. 15/207,359, filed on Jul. 11, 2016, now Pat. No. 11,256,253.

(51) Int. Cl.

| | |
|---|---|
| *B64D 17/62* | (2006.01) |
| *B64D 17/72* | (2006.01) |
| *B64D 17/80* | (2006.01) |
| *B64D 45/00* | (2006.01) |
| *B64U 70/83* | (2023.01) |
| *G05D 1/00* | (2024.01) |
| *G05D 1/46* | (2024.01) |
| *G05D 1/81* | (2024.01) |

(52) U.S. Cl.
CPC .............. *B64D 45/00* (2013.01); *G05D 1/042* (2013.01); *G05D 1/0808* (2013.01); *G05D 1/46* (2024.01); *G05D 1/81* (2024.01); *B64D 17/725* (2013.01); *B64D 2045/0085* (2013.01); *B64U 70/83* (2023.01)

(58) Field of Classification Search
CPC ........ B64D 17/62; B64D 17/80; B64D 45/00; B64D 17/725; B64D 2045/0085; B64U 70/83
See application file for complete search history.

(56) References Cited

U.S. PATENT DOCUMENTS

| | | | |
|---|---|---|---|
| 3,224,714 | A | 12/1965 | Mulcahy, Jr. |
| 3,315,920 | A | 4/1967 | Caughron |
| 3,463,425 | A | 8/1969 | Tatsusaburo |
| 3,622,108 | A | 11/1971 | Mathewson |
| 3,726,499 | A | 4/1973 | Stencel |
| 3,759,469 | A | 9/1973 | Nimylowycz |
| 3,790,113 | A | 2/1974 | Nimylowycz |
| 3,796,398 | A | 3/1974 | Eilertson |
| 3,833,192 | A | 9/1974 | Vitack |
| 3,862,731 | A | 1/1975 | McIntyre |
| 3,913,873 | A | 10/1975 | Nimylowycz |
| 3,926,391 | A | 12/1975 | Nordine |
| 4,033,528 | A | 7/1977 | Diggs |
| 4,040,583 | A | 8/1977 | Bihrle, Jr. |
| 4,113,208 | A | 9/1978 | Manfredi |
| 4,480,807 | A | 11/1984 | Bowen |
| 4,496,122 | A | 1/1985 | Whipple |
| 4,538,778 | A | 9/1985 | White |
| 4,637,577 | A | 1/1987 | Miseyko |
| H776 | H | 5/1990 | Cole |
| 5,020,739 | A | 6/1991 | Vairo |
| 5,169,093 | A | 12/1992 | Schoffl |
| 5,356,097 | A | 10/1994 | Chalupa |
| 5,547,149 | A | 8/1996 | Kalberer |
| 5,673,873 | A | 10/1997 | Stemme |
| 5,826,827 | A | 10/1998 | Coyaso |
| 5,836,544 | A | 11/1998 | Gentile |
| 5,878,979 | A | 3/1999 | Fisher |
| 5,899,414 | A | 5/1999 | Duffoo |
| 5,921,503 | A | 7/1999 | Tsay |
| 6,808,144 | B1 | 10/2004 | Nicolai |
| 7,234,667 | B1 | 6/2007 | Talmage, Jr. |
| 7,487,939 | B1 | 2/2009 | Christof |
| 7,523,891 | B2 * | 4/2009 | Hakki .................... B64D 17/80 244/152 |
| 7,934,682 | B2 | 5/2011 | Manfredi |
| 8,074,919 | B1 | 12/2011 | Kulesha |
| 8,240,610 | B1 | 8/2012 | Cooper |
| 9,145,212 | B1 | 9/2015 | Wei |
| 9,613,539 | B1 | 4/2017 | Lindskog |
| 11,390,382 | B1 * | 7/2022 | Anderson .............. B64U 70/83 |
| 11,459,113 | B2 | 10/2022 | Robertson |
| 2003/0025038 | A1 | 2/2003 | Nicolai |
| 2007/0145193 | A1 | 6/2007 | Hakki |
| 2009/0189022 | A1 | 7/2009 | Hoffmann |
| 2009/0308979 | A1 | 12/2009 | Nadir |
| 2010/0004803 | A1 | 1/2010 | Manfredi |
| 2013/0175398 | A1 | 7/2013 | Chia |
| 2014/0367509 | A1 | 12/2014 | Smith |
| 2015/0266578 | A1 | 9/2015 | Elkins |
| 2015/0321758 | A1 | 11/2015 | Sarna, II |
| 2016/0251083 | A1 | 9/2016 | Tsaliah |
| 2016/0318615 | A1 | 11/2016 | Pick |
| 2017/0106986 | A1 | 4/2017 | Sweeny |
| 2017/0158337 | A1 | 6/2017 | Erickson |
| 2017/0233088 | A1 | 8/2017 | Homan |
| 2017/0313433 | A1 | 11/2017 | Ozaki |
| 2017/0334568 | A1 | 11/2017 | Luo |
| 2018/0118353 | A1 | 5/2018 | Vander Lind |
| 2024/0199187 | A1 | 6/2024 | Haghighat |

FOREIGN PATENT DOCUMENTS

| | | |
|---|---|---|
| CN | 202541839 | 11/2012 |
| CN | 103332291 | 10/2013 |
| CN | 104760702 | 7/2015 |
| CN | 105416557 | 3/2016 |
| CN | 105416595 | 3/2016 |
| CN | 108146639 | 6/2018 |
| DE | 3433434 | 3/1986 |
| FR | 2772340 | 6/1999 |
| KR | 20120048807 | 5/2012 |
| WO | 9950142 | 10/1999 |
| WO | 0174659 | 10/2001 |

OTHER PUBLICATIONS

WU, CN 202541839 U, Aircraft with Fault Descent, EPO translation (Mar. 28, 2020) (Year: 2020).

* cited by examiner 1302    1304

1304

1302

1300

AUTOMATED AIRCRAFT RECOVERY SYSTEM

CROSS REFERENCE TO OTHER APPLICATIONS

This application is a continuation of U.S. patent application Ser. No. 18/589,243 entitled AUTOMATED AIRCRAFT RECOVERY SYSTEM filed Feb. 27, 2024, which is a continuation of U.S. patent application Ser. No. 17/558, 170, now U.S. Pat. No. 11,947,352, entitled AUTOMATED AIRCRAFT RECOVERY SYSTEM filed Dec. 21, 2021, which is a continuation of U.S. patent application Ser. No. 15/207,359, now U.S. Pat. No. 11,256,253, entitled AUTOMATED AIRCRAFT RECOVERY SYSTEM filed Jul. 11, 2016, each of which is incorporated herein by reference for all purposes.

BACKGROUND OF THE INVENTION

The time between when an emergency occurs and when an aircraft is fully caught by a parachute is critical. Decreasing the time may increase the chances of the aircraft being recovered without damage. Determining the correct recovery moves to enact can be complex and time consuming.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An automated aircraft recovery system is disclosed. The automated aircraft recovery system includes an interface configured to receive sensor data. It also includes a control mechanism configured to automatically perform a recovery action that is determined based at least in part on the sensor data.

In some embodiments, the automated aircraft recovery system receives information on the aircraft and its surrounding environmental conditions from sensors on the aircraft. The system may determine a best course of recovery actions using the parachutes, rockets, or other recovery mechanisms the aircraft is equipped with in combination with maneuvering the aircraft itself.

Figure 1:
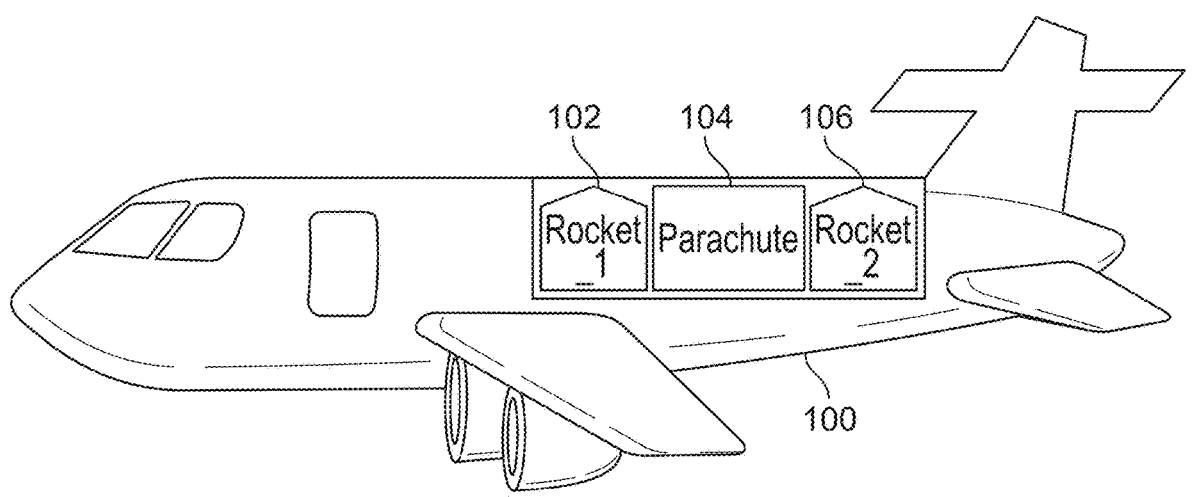
FIG. 1 is a diagram illustrating an embodiment of an aircraft comprising a multi-rocket parachute deployment system before deployment.

FIG. 1 is a diagram illustrating an embodiment of an aircraft comprising a multi-rocket parachute deployment system before deployment. In some embodiments, the system is used to recover an aircraft and the parachute is attached to the aircraft. The aircraft may be manned or unmanned. The aircraft may be a multicopter. The first projectile and the second projectile may be attached to the aircraft or stored on the aircraft. In the example shown, aircraft 100 includes rocket_1 102, parachute 104, and rocket_2 106. In the example shown, rocket_1 102, parachute 104, and rocket_2 106 are stored inside aircraft 100 towards the tail end of aircraft 100. Parachute 104, rocket_1 102, and rocket_2 106 may be positioned towards the tail end of aircraft 100 such that the parachute is deployed towards the tail end, dropping the aircraft in a nose-down configuration. A nose-down configuration may load the landing gear consecutively or allow for a gentle landing. In some embodiments, the nose-down configuration allows landing gear of the aircraft to collapse and absorb energy from the fall. The rockets and parachute may be stored in a container such as a box. The rockets and parachute may be stored near a window at the top of the aircraft, attached to the outside of the aircraft, stored at a center of gravity of the aircraft, attached at an optimal parachute deployment location, or arranged in any other appropriate position on the aircraft.

Figure 2:
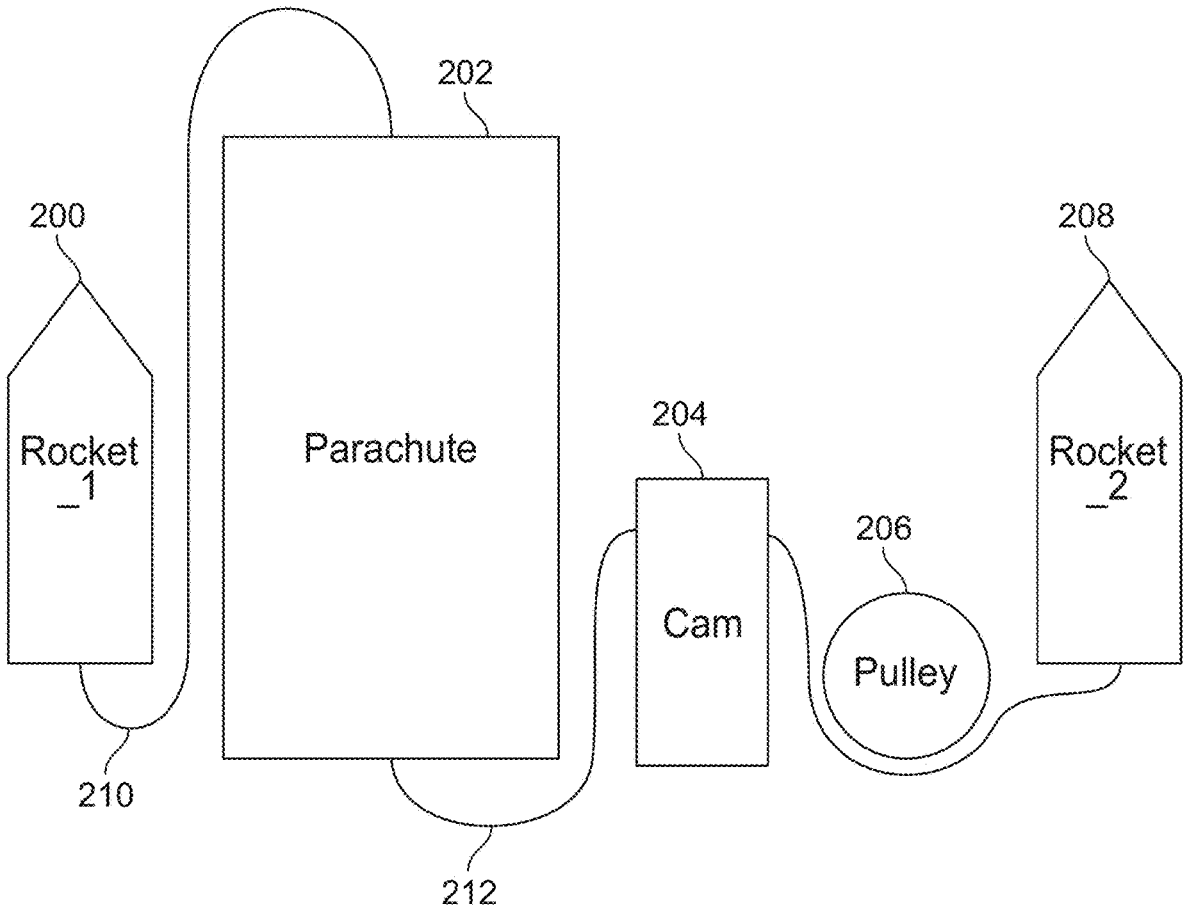
FIG. 2 is a diagram illustrating an embodiment of a multi-rocket parachute deployment system before deployment.

FIG. 2 is a diagram illustrating an embodiment of a multi-rocket parachute deployment system before deployment. In some embodiments, the example shown is an expansion of the multi-rocket parachute deployment components shown in FIG. 1. In the example shown, rocket_1 200 is connected to parachute 202 via tether 210. Tether 210 may be attached to a cover or casing of parachute 202.

Parachute 202 may be stored inside a flexible sock-like cover. Parachute 202 may be contained in a canister, wherein tether 210 is attached to a cover of the canister. In some embodiments, a riser of the parachute runs through a mechanism that allows the riser to be pulled through the mechanism in one direction but not in an opposite direction. In the example shown, riser 212 is connected to the parachute and runs through cam cleat 204. Cam cleat 204 is a device that allows riser 212 to be pulled through it from the left to the right, but does not allow riser 212 to be pulled through in the opposite direction. In some embodiments, riser 212 is in a cleat. When riser 212 ceases to be pulled through the cleat towards the right, the tension of the riser may cause the cams to rotate inward. The riser may be pinned between the cams and be prevented from running through in the reverse direction. In some embodiments, a riser of the parachute runs through a mechanism that redirects the riser with minimal friction. In various embodiments, the mechanism comprises one of the following: a pulley, a running block, a ring, or a low friction system. The mechanism chosen may depend on how quickly the riser needs to be able to be brought through, strength needs, weight requirements, or any other appropriate factor. The mechanism may be used to prevent snagging of the riser. In some embodiments, the second projectile of the system is attached to a riser of the parachute running through a mechanism that redirects the riser with minimal friction or running through a mechanism that allows the riser to be pulled through the mechanism in one direction but not in an opposite direction. In the example shown, riser 212 travels through cam cleat 204, though pulley 206, and is attached to rocket_2 208.

In some embodiments, rocket_1 200 and rocket_2 208 are attached to a canister containing parachute 202. In some embodiments, cam cleat 204 and pulley 206 are attached to a shared mounting plate. Rocket_1 200, parachute 200, cam cleat 204, pulley 206, and rocket_2 208 may be arranged in any appropriate position that maintains the orientations of tether 210 and riser 212 in connecting the system elements.

Figure 3:
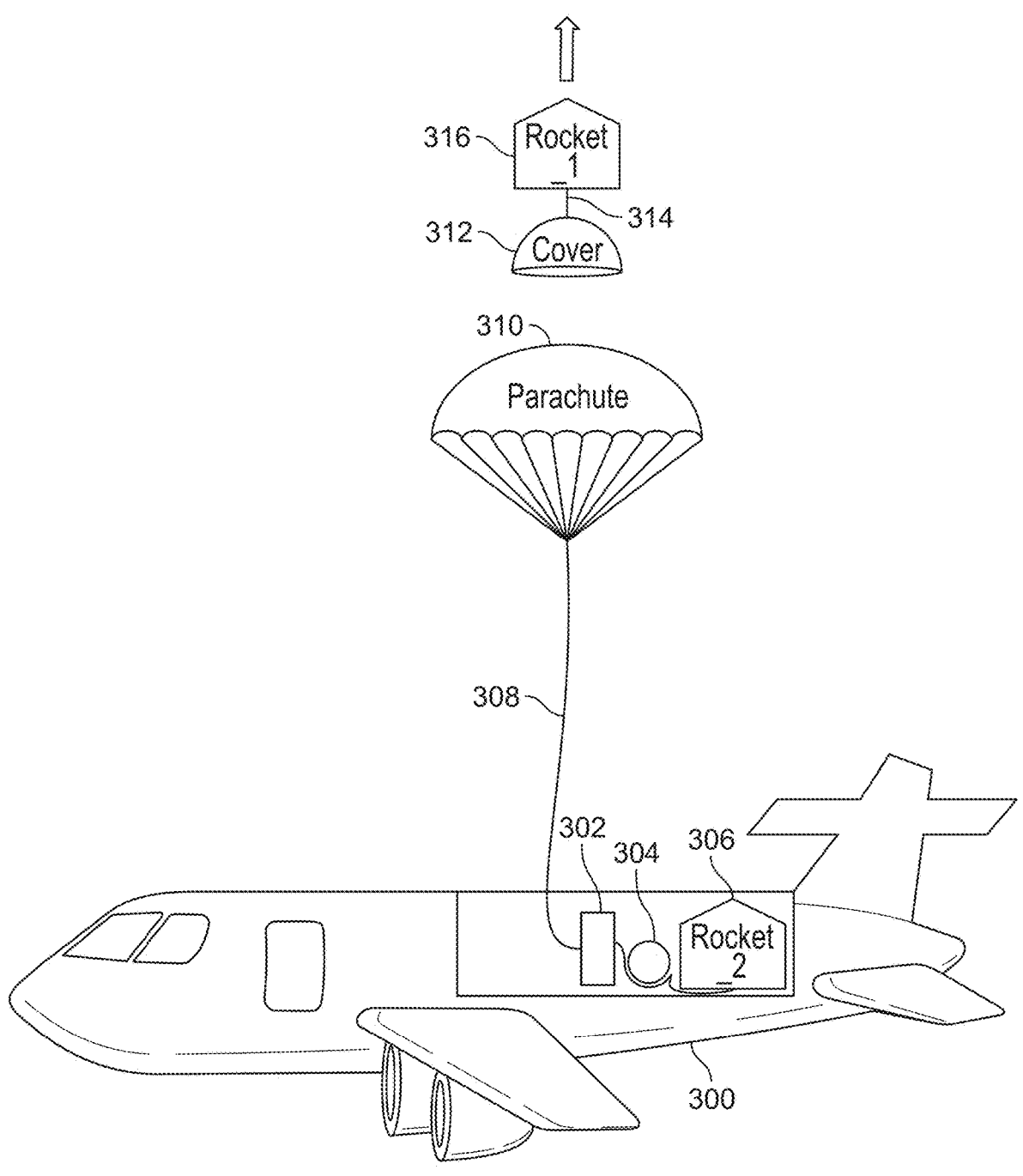
FIG. 3 is a diagram illustrating an embodiment of an aircraft comprising a multi-rocket parachute deployment system after deployment of a first rocket.

FIG. 3 is a diagram illustrating an embodiment of an aircraft comprising a multi-rocket parachute deployment system after deployment of a first rocket. In the example shown, rocket_1 316 is deployed from aircraft 300. In the event that the rocket is stored inside the aircraft, deploying the aircraft may break a window or create a hole in a surface of the aircraft. The rocket may be stored in a location such that breaking the surface of the aircraft is not detrimental to the aircraft. For example, the rocket or other recovery components may be stored in an isolated container such that a rocket deployment does not cause air to leak into the entire cabin of the aircraft. A window or panel of the aircraft may be designed to fall off in one piece when the rocket is deployed. In some embodiments, propelling the first projectile pulls a cover off the parachute. In the example shown, rocket_1 316 is propelled vertically and is attached to parachute cover 312 via tether 314. Parachute 310 is deployed, but is not fully inflated. Parachute 310 may be wrinkled, partially collapsed, or folded. Riser 308 of parachute 310 runs through cam cleat 302 and pulley 304. The end of riser 308 not attached to parachute 310 is attached to rocket_2 306. Cam cleat 302, pulley 304, and rocket_2 306 remain in aircraft 300 after the deployment of rocket_1 316.

Figure 4:
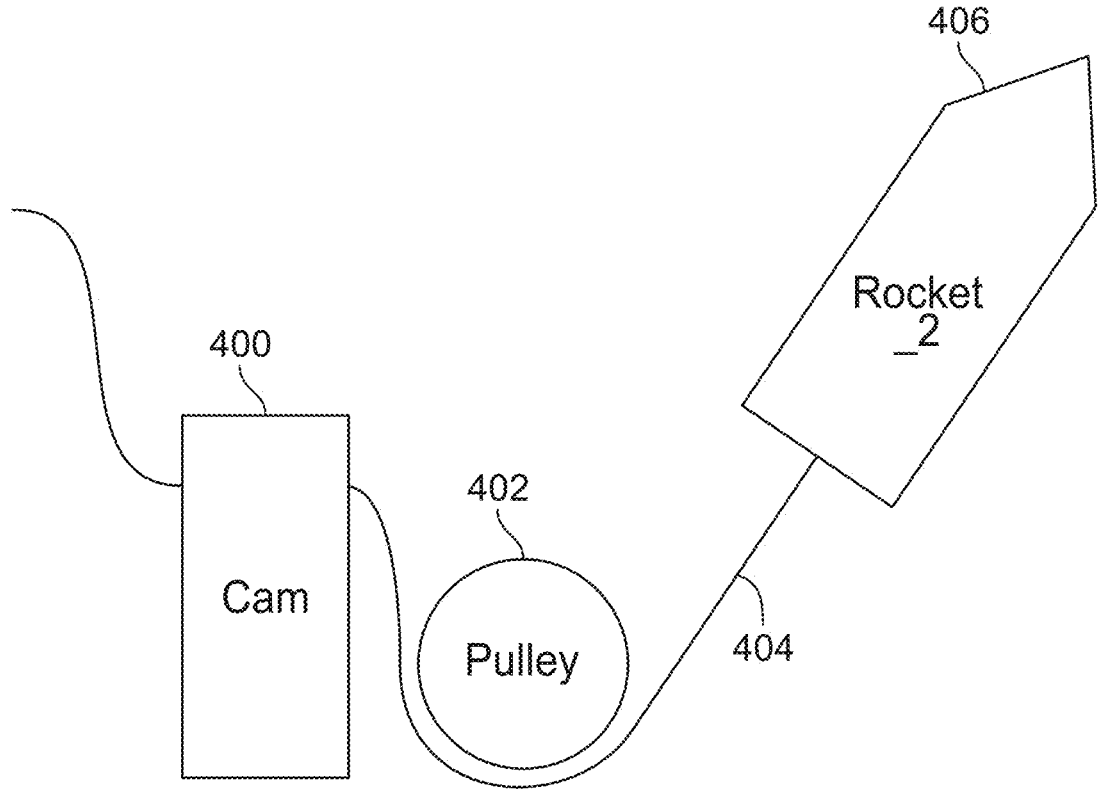
FIG. 4 is a diagram illustrating an embodiment of a multi-rocket parachute deployment system after deployment of a second rocket.

FIG. 4 is a diagram illustrating an embodiment of a multi-rocket parachute deployment system after deployment of a second rocket. Riser 404 runs through cam cleat 400 and pulley 402. Riser 404 is attached to rocket_2 406. In the example shown, rocket_2 406 is propelled at a roughly 45 degree angle from the horizontal. Pulley 402 allows riser 404 to be pulled with minimal friction in a new direction.

Figure 5:
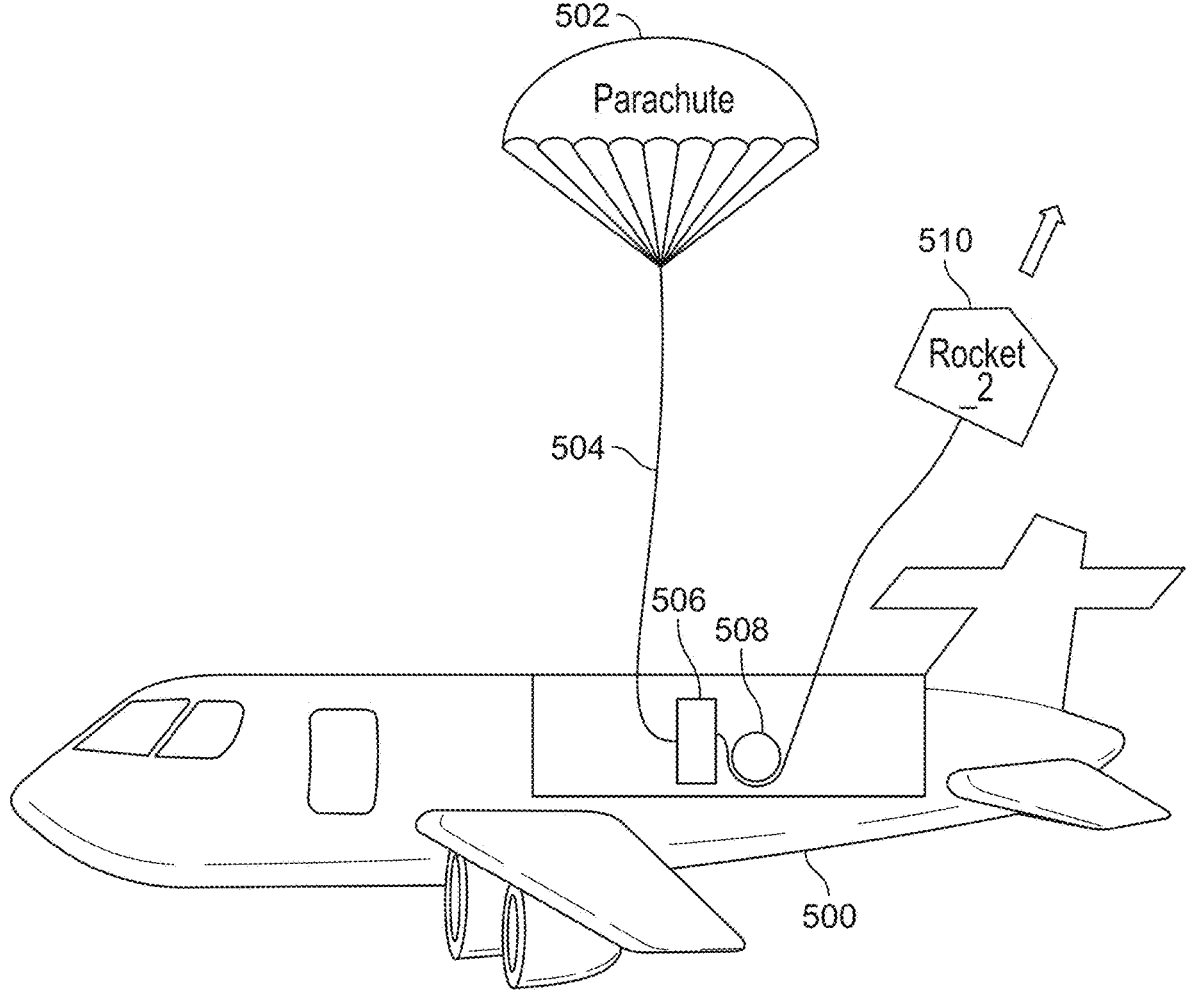
FIG. 5 is a diagram illustrating an embodiment of an aircraft comprising a multi-rocket parachute deployment system after deployment of a second rocket.

FIG. 5 is a diagram illustrating an embodiment of an aircraft comprising a multi-rocket parachute deployment system after deployment of a second rocket. In the example shown, the first projectile that deployed parachute 502 has been propelled away from aircraft 500 along with the parachute cover. In some embodiments, the first direction that the first projectile is propelled in and the second direction that the second projectile is propelled in form an acute angle. In the example shown, rocket_2 510 is propelled vertically and towards the tail end of aircraft 500. Rocket_2 510 pulls riser 504 through cam cleat 506 and pulley 508, causing parachute 502 to be tugged downwards. In some embodiments, the second projectile causes the parachute to rapidly fill with air. Rocket_2 510 may be propelled at a high speed that causes parachute 502 to move towards ground faster than it would fall otherwise. Propelling the second projectile may cause the parachute to experience a load similar to a full load of an aircraft. For example, a force that rocket_2 510 exerts on parachute 502 by pulling the riser may be the same force that parachute 502 would experience when fully inflated and carrying the aircraft's full weight. The deployment of rocket_2 510 may cause parachute 502 to fully inflate. The deployment of the second projectile may cause an initial large load on the parachute as the projectile yanks the parachute down, and then the parachute slowly takes on the entire load of the airplane as it slowly inflates to its full capacity. Cam cleat 506 may allow rocket_2 510 to pull riser 504 through it while preventing riser 504 from being pulled through it in the opposite direction. Cam cleat 506 may force the parachute to be pulled down and inflate by preventing riser 504 from being pulled through. In some embodiments, a stopping feature in riser 504 prevents it from being pulled too far through cam cleat 506, preventing the parachute from being pulled too close to the aircraft. The stopper may be a knot or another obstacle in the riser that prevents the riser from being pulled through the cam cleat past a certain point.

In some embodiments of typical parachute deployment systems, the parachute does not fully inflate until the aircraft has fallen a distance three times a diameter of the parachute. In some aircraft emergency situations, allowing the aircraft to fall for that distance is not feasible. For example, the aircraft may be close to the ground already and allowing the aircraft to accelerate downwards for that time without a full inflation of the parachute may cause the aircraft to be damaged upon landing. The multi-rocket deployment system may cause the parachute to be extracted in a shorter fall distance and a shorter time. A typical "stack up" time from a recognition of an emergency to the aircraft being steadily caught by an inflated parachute may be in the order of four to five seconds. Decreasing the "stack up" time using a multi-rocket deployment system may greatly impact damage done to the aircraft or a passenger of the aircraft.

After deployment, rocket_2 510 may fall and hang off aircraft 500 upon running out of fuel. Rocket_2 510 may be lightweight and cause negligible negative effects while remaining attached to riser 504. Rocket_2 510 may be attached to riser 504 via a connection that releases after a predetermined amount of time or after being propelled a predetermined distance. Rocket_2 510 may be detached after the predetermined time or distance and fall away from aircraft 500. In some embodiments, the rocket is detached via an element in the line that breaks away with a predetermined amount of force. For example, a section of the line tethered to the rocket may be thinner than the sections of line surrounding it. The thin section of line may break when the rocket reaches the end of the line or exerts a certain force on the line, releasing the rocket.

Figure 6:
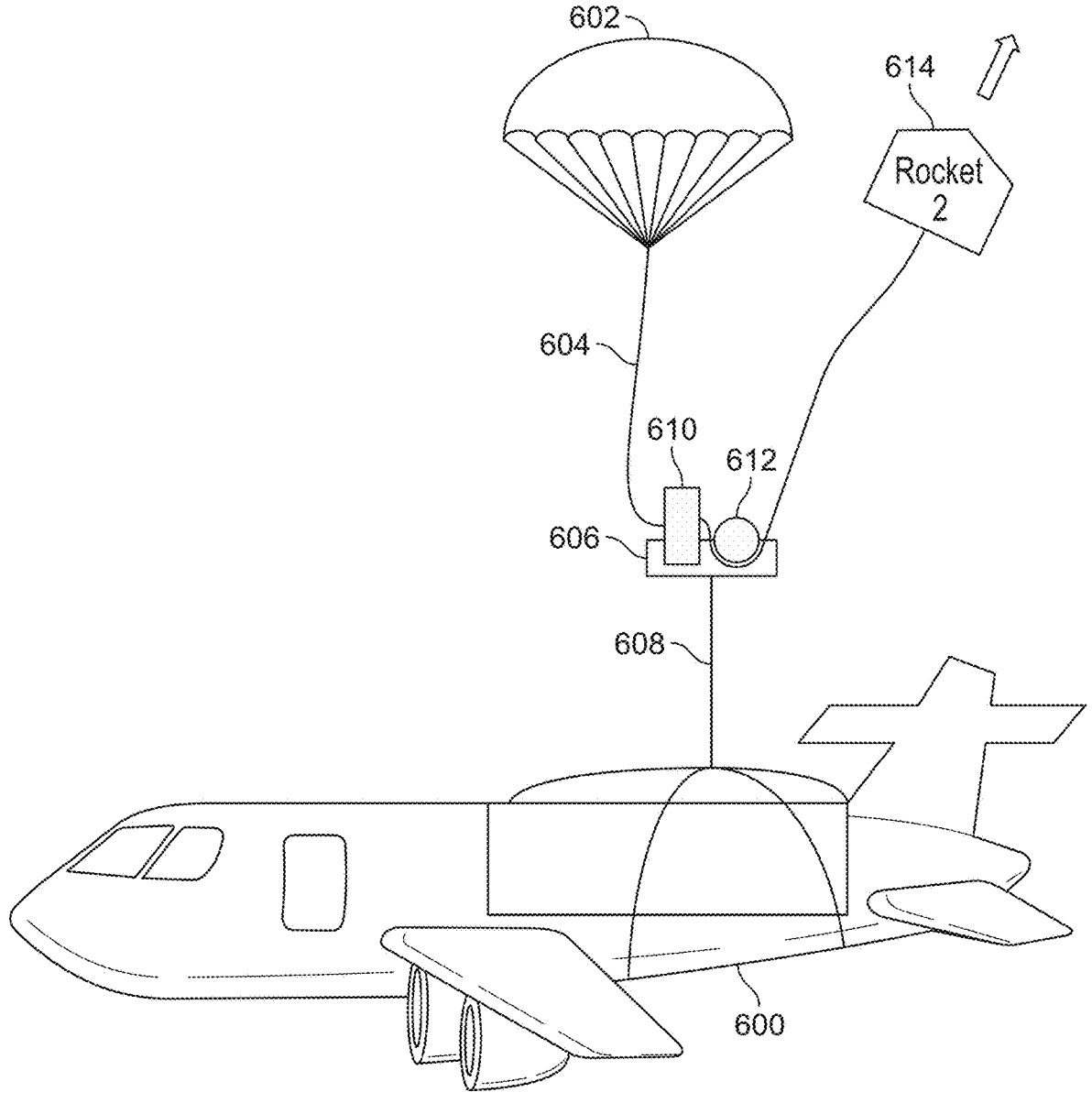
FIG. 6 is a diagram illustrating an embodiment of an aircraft comprising a multi-rocket parachute deployment system after a breakaway.

FIG. 6 is a diagram illustrating an embodiment of an aircraft comprising a multi-rocket parachute deployment system after a breakaway. In some embodiments, the mechanism that allows the riser to be pulled through the mechanism in one direction but not in an opposite direction detaches from an aircraft upon experiencing a load of a predetermined threshold. The predetermined threshold may be the upward force exerted by the parachute when fully inflated. For example, as the parachute becomes fully or mostly inflated, the parachute exerts an upward force that slows down the aircraft's fall. The upward force from the parachute may cause the mechanism to break off of the aircraft. The mechanism may be originally attached to the aircraft and a bridle of the parachute. In some embodiments, the mechanism is configured to detach from the aircraft such that the load of the parachute is transferred to the bridle of the parachute. The bridle may be a harness attached to the aircraft. The bridle may be attached to the aircraft at critical load bearing points. The bridle may be attached to a frame of the aircraft. In some embodiments, the bridle controls the orientation of the aircraft as the aircraft falls, suspended below the parachute. The bridle by its design may control how the structure of the aircraft is loaded by the parachute as the parachute fills with air.

In some embodiments, the mechanism that allows one-way movement of a line through it and the friction-minimizing redirecting mechanism are attached to a shared surface. In the example shown, cam cleat 610 and pulley 612 are attached to shared surface 606. Shared surface 606 may allow cam cleat 610 to break off from aircraft 600 while maintaining its orientation in regards to pulley 612 and preventing damage to aircraft 600. Rocket_2 614 pulls riser 604, causing parachute 602 to fully inflate. Upon full inflation of parachute 602, surface 606 breaks off of aircraft 600. Shared surface 606 is attached to bridle 608. Parachute 602 slows down aircraft 600 via bridle 608, allowing the upward force of the parachute to be spread across the aircraft.

Figure 7:
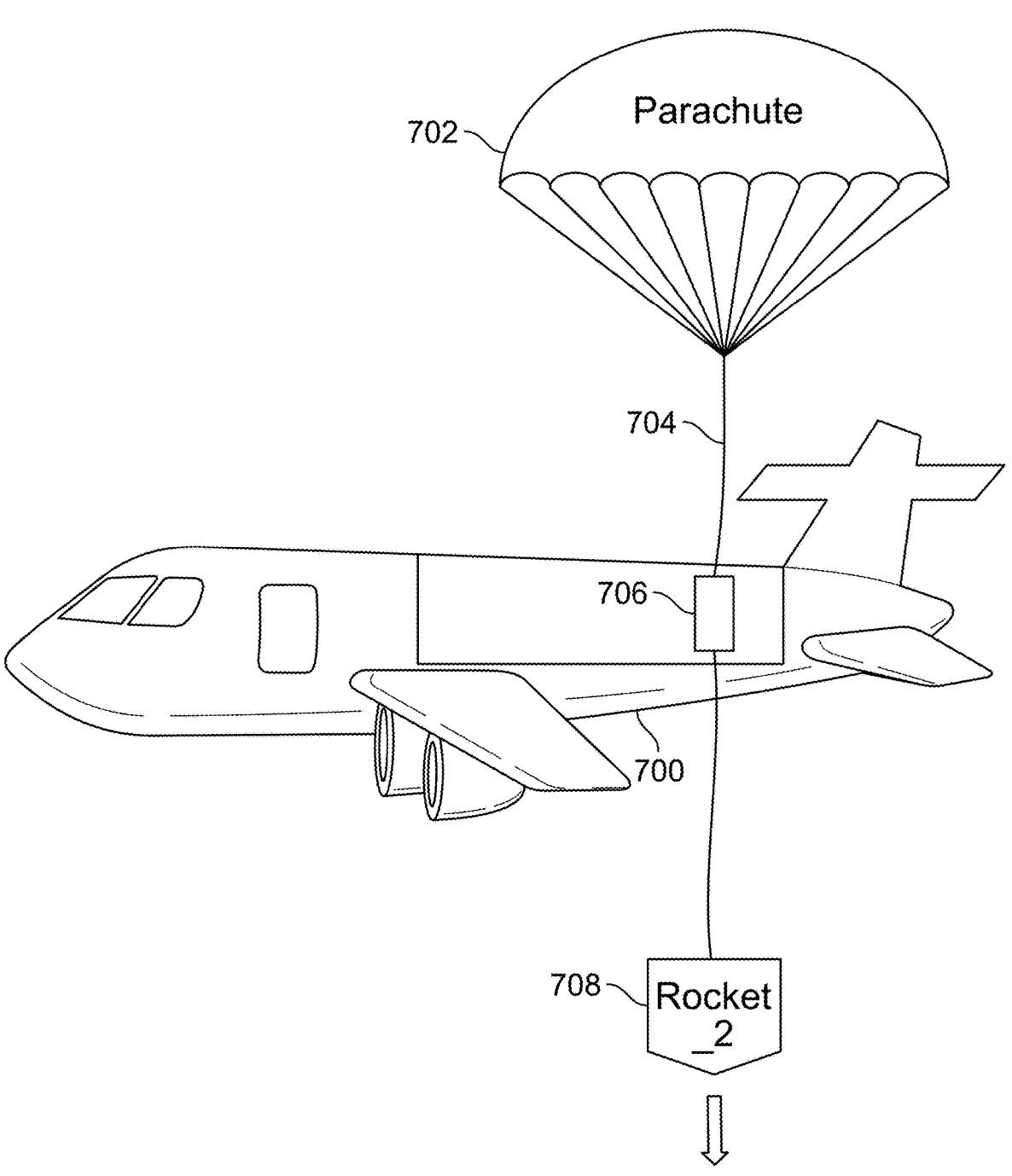
FIG. 7 is a diagram illustrating an embodiment of an aircraft comprising a multi-rocket parachute deployment system after deployment of a second rocket towards ground.

FIG. 7 is a diagram illustrating an embodiment of an aircraft comprising a multi-rocket parachute deployment system after deployment of a second rocket towards ground. In some embodiments, the second direction that the second projectile is propelled in is towards ground. The second projectile may be propelled through a hole in an aircraft. The hole may be at the underside of the aircraft. Propelling the second projectile towards ground may prevent the need for a redirecting device. Propelling the second projectile towards ground may prevent load and friction from being created in contrast to the configuration of FIG. 5. A device that allows the riser to run through in one direction but not the reverse is required to prevent the parachute from pulling the riser back up. In the example shown, a first projectile may have caused parachute 702 to deploy. Rocket_2 708 is deployed downwards, pulling riser 704 through cam cleat 706. Rocket_2 708 deployed through aircraft 700. Rocket_2 708 yanks parachute 702 down, causing the parachute to quickly fill. Parachute 702 fills because riser 704 cannot be pulled back up through cam cleat 706.

Figure 8:
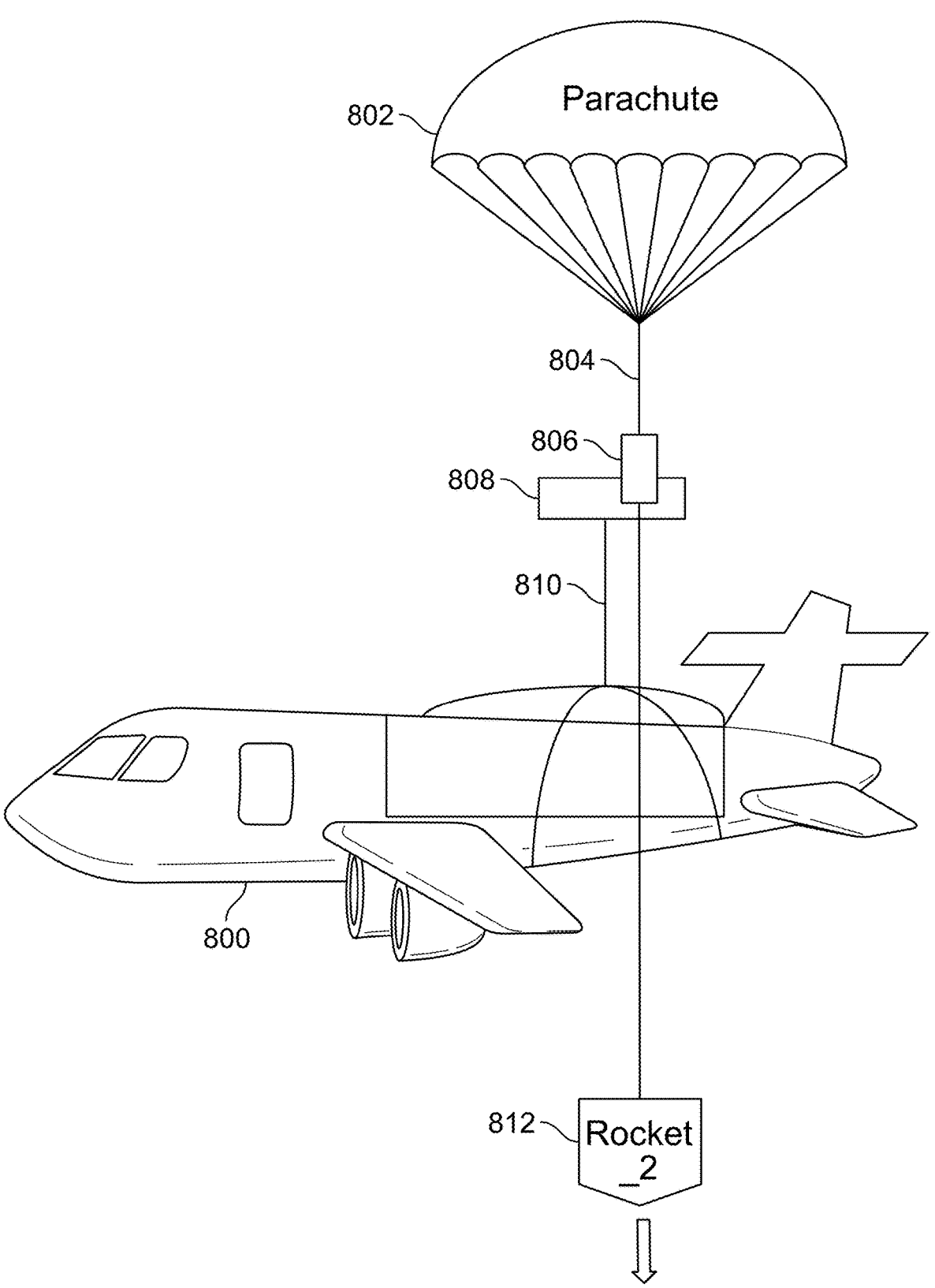
FIG. 8 is a diagram illustrating an embodiment of an aircraft comprising a multi-rocket parachute deployment system after a breakaway.

FIG. 8 is a diagram illustrating an embodiment of an aircraft comprising a multi-rocket parachute deployment system after a breakaway. In some embodiments, FIG. 8 follows FIG. 7 in a series of deployment events. In the example shown, rocket_2 812 has deployed, causing parachute 802 to become fully inflated. As parachute 802 exerts an upward force on cam cleat 806, cam cleat 806 detaches from aircraft 800 upon experiencing a predetermined threshold of force. In the example shown, cam cleat 806 is mounted on plate 808. Plate 808 is attached to bridle 810. In some embodiments, bridle 810 is directly attached to cam cleat 806.

Figure 9:
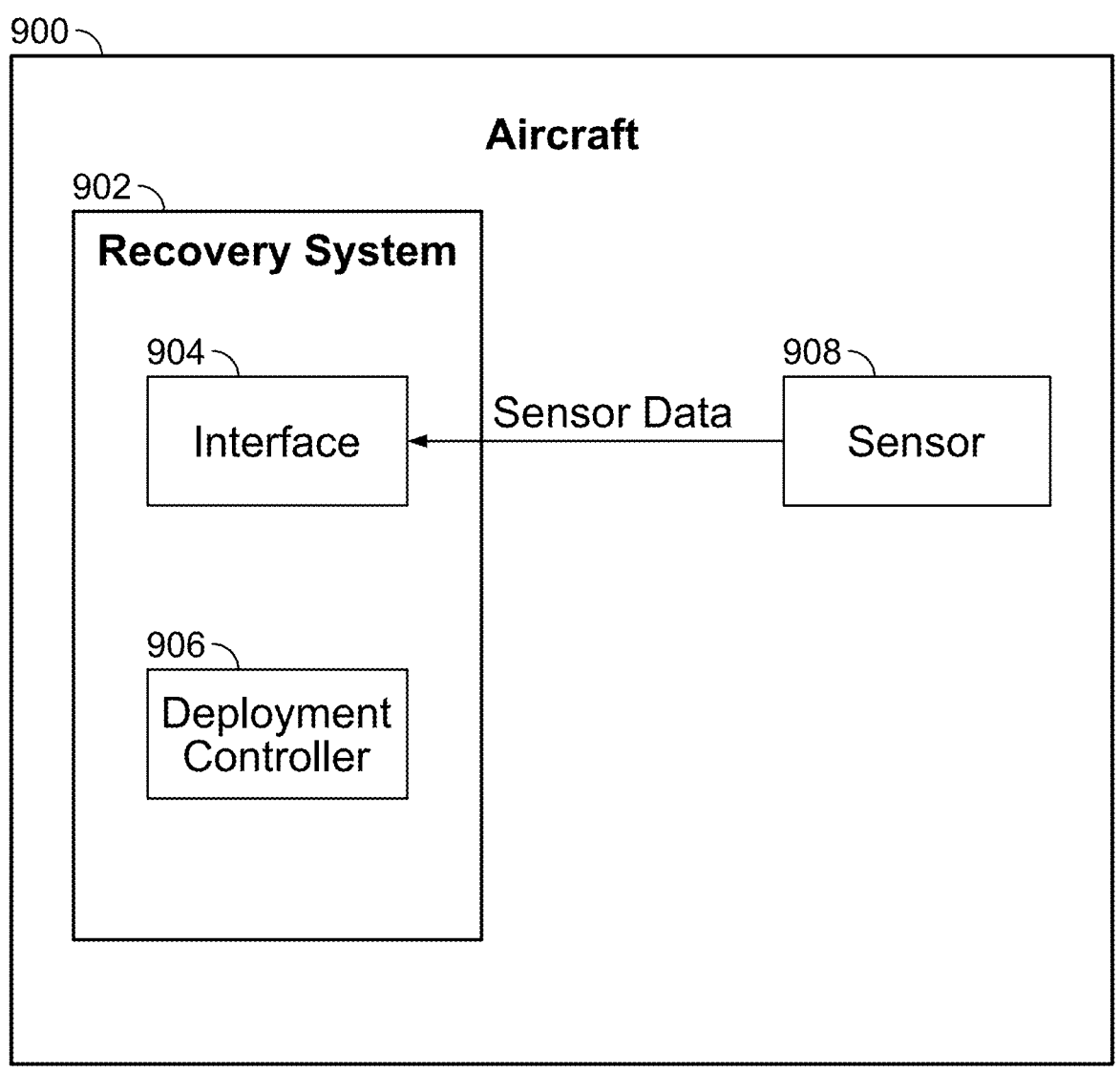
FIG. 9 is a block diagram illustrating an embodiment of a multi-rocket parachute deployment system.

FIG. 9 is a block diagram illustrating an embodiment of a multi-rocket parachute deployment system. In the example shown, aircraft 900 includes recovery system 902 and sensor 908. Recovery system 902 includes interface 904 and deployment controller 906. In some embodiments, sensor 908 receives sensor data regarding wind, an aircraft speed, weather, visibility, or any other appropriate information. Sensor data may be received by interface 904 of recovery system 902. The sensor data may be used by deployment controller 906 to automatically deploy the first or second projectiles. Deployment controller 906 may comprise a processor. Recovery system 902 may be entirely mechanical. For example, sensor data mechanically triggers one or more projectiles to deploy. The recovery system may be triggered by a pilot of the aircraft.

Figure 10:
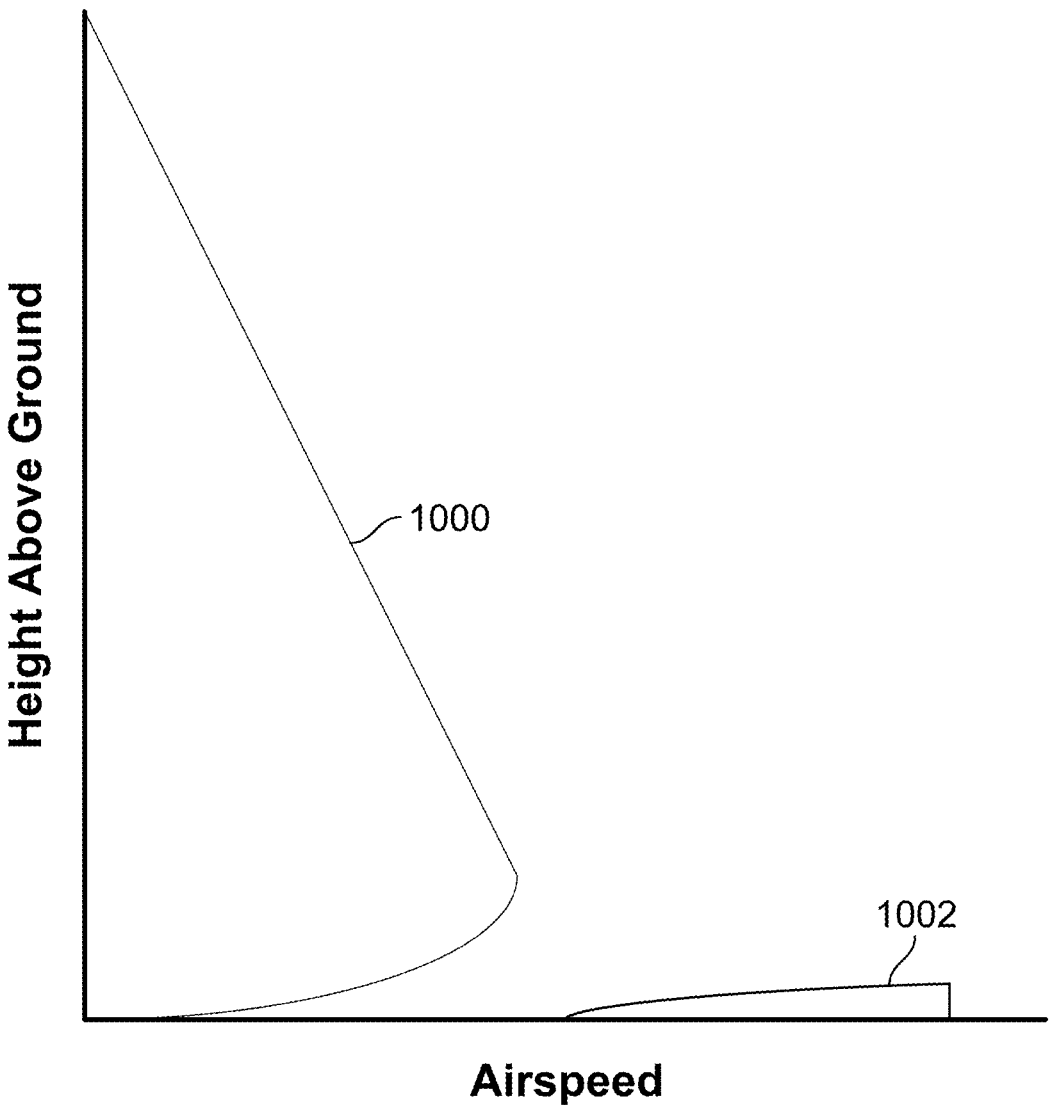
FIG. 10 is a diagram illustrating an embodiment of a relationship between airspeed and a height above ground for an aircraft.

FIG. 10 is a diagram illustrating an embodiment of a relationship between airspeed and a height above ground for an aircraft. The graph may be referred to as the "coffin corner" or "dead man's curve" by helicopter pilots. Areas 1000 and 1002 may include unsafe modes of operation. Areas 1000 and 1002 may be areas that the aircraft is desired to be recovered and a recovery system is activated. Areas 1000 and 1002 may be areas from which a typical recovery system cannot recover an aircraft. Area 1000 includes conditions of a low airspeed and a low distance from ground. A multi-rocket deployment system allows the aircraft to deploy a parachute quickly, allowing for recovery even at a low airspeed. In some embodiments, the system allows the aircraft to be recovered in "zero-zero" conditions wherein the aircraft is close to the ground and traveling at a low speed. Area 1002 includes high airspeed and low altitude conditions. In some embodiments, deploying different parachutes based on conditions allows the aircraft to avoid danger zones 1000 and 1002. In some embodiments, a system that allows for automatic recovery actions helps the aircraft avoid areas 1000 and 1002 or helps the aircraft to return to more favorable airspeeds and altitudes.

Figure 11:
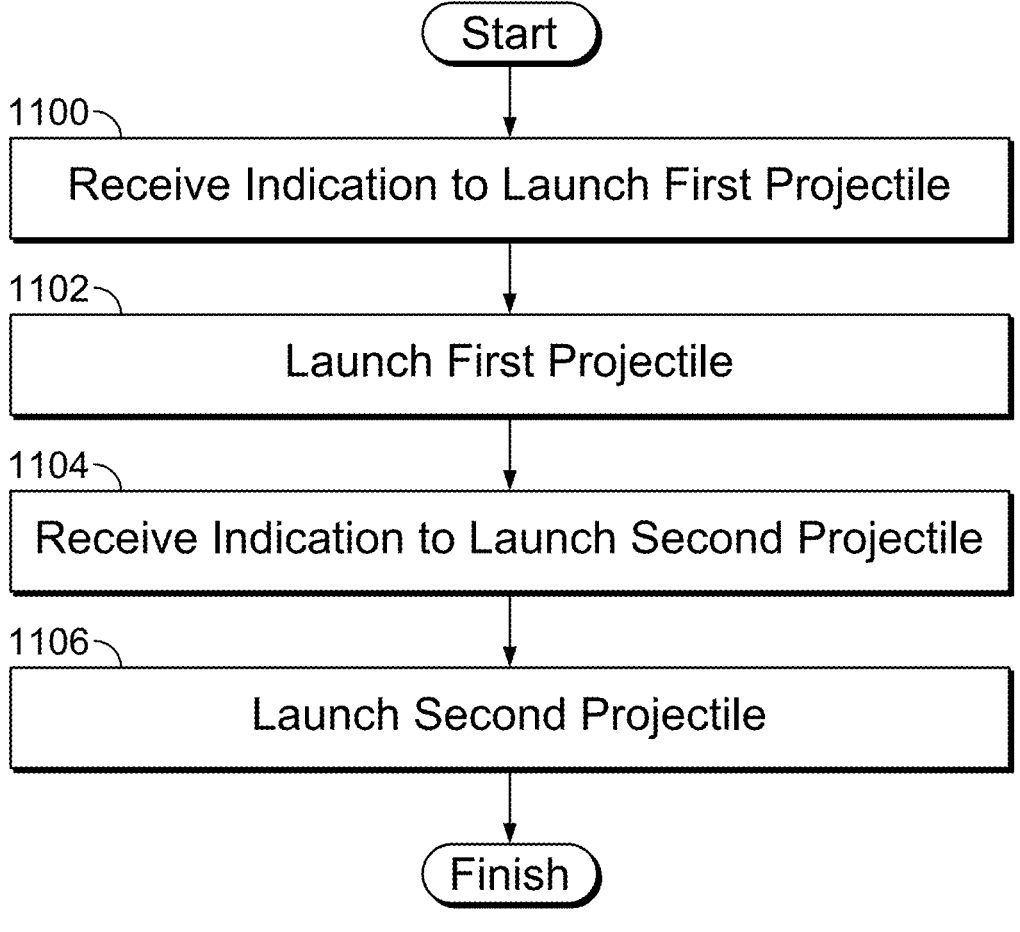
FIG. 11 is a flow diagram illustrating an embodiment of a multi-rocket parachute deployment system process.

FIG. 11 is a flow diagram illustrating an embodiment of a multi-rocket parachute deployment system process. In 1100, an indication to launch a first projectile is received. The indication to launch the first projectile may be a human action. For example, a pilot may press a button, hit a trigger, or a pull a lever that indicates an emergency has occurred. A human may indicate solely to launch the first projectile. In 1102, the first projectile is launched. In 1104, an indication to launch a second projectile is received. The indication to launch the second projectile may be a human action. A processor may control projectile deployments and provide an instruction to the second projectile to be launched. The second projectile may launch automatically after the first rocket. For example, the second projectile may have a mechanical fuse, wherein the fuse is longer than a mechanical fuse of the first projectile. The second projectile may be launched after a predetermined delay from the launch of the first projectile. In 1106, the second projectile is launched.

Figure 12:
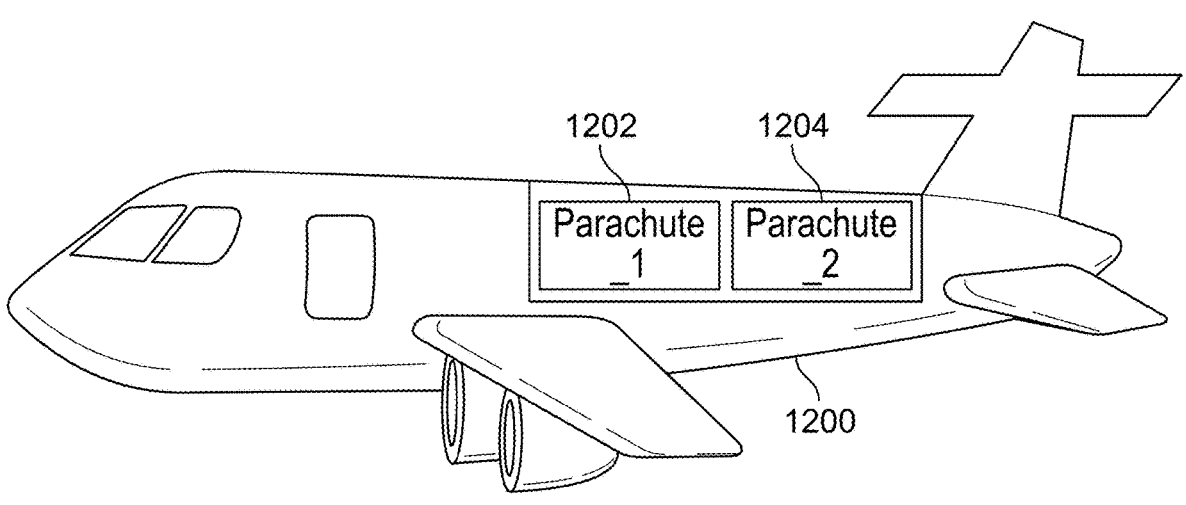
FIG. 12 is a diagram illustrating an embodiment of an aircraft comprising a multimodal aircraft recovery system before deployment.

FIG. 12 is a diagram illustrating an embodiment of an aircraft comprising a multimodal aircraft recovery system before deployment. In some embodiments, the first parachute and the second parachute are attached to or stored on an aircraft. The aircraft may be a multicopter. Multicopters may be more likely than other aircraft to fly at altitude and speed combinations that cause them to be difficult to recover. A multicopter may fly at low altitude, low speed "coffin corner" conditions. A multicopter may not have large enough rotors to use the rotors' interia to slow its fall. A recovery system may be a critical component of a multicopter. In the example shown, aircraft 1200 includes parachute_1 1202 and parachute_2 1204. Parachute_1 1202 and parachute_2 1204 may be optimized for different conditions.

The first parachute and the second parachute may be deployed based on one or more determined conditions. The one or more determined conditions are determined based on sensor data collected by a sensor on an aircraft. The one or more determined conditions may comprise one or more of the following: an altitude, a global positioning system (GPS) data, a speed, an acceleration, or a directionality. The multimodal recovery system may include two, six, sixteen, or any appropriate number of parachutes.

Figure 13A:
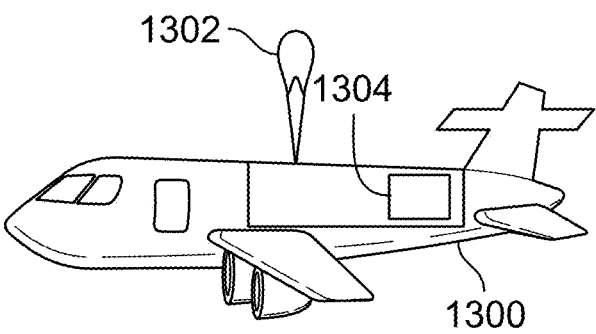
FIG. 13A is a diagram illustrating an embodiment of an aircraft comprising a multimodal aircraft recovery system after deployment of a first parachute.
Figure 13A:

FIG. 13A is a diagram illustrating an embodiment of an aircraft comprising a multimodal aircraft recovery system after deployment of a first parachute. In the example shown, aircraft 300 is flying at a high distance from ground. Aircraft 300 may be traveling at a high altitude and a high speed. First parachute 1302 is deployed. First parachute 1302 may be optimized for a first set of conditions comprising a high speed and a high altitude. The first parachute may be smaller, more robust, more heavyweight, or able to withstand a greater load than the second parachute. In the example shown, second parachute 1304 is not extracted. First parachute 1302 may be deployed as an initial slowing action. First parachute 1302 may be made of a thick, strong material that can withstand the high speed at which aircraft 1300 is falling. First parachute 1302 may be a small parachute because a large parachute made with thick, strong material creates a weight restraint on the aircraft.

Figure 13B:
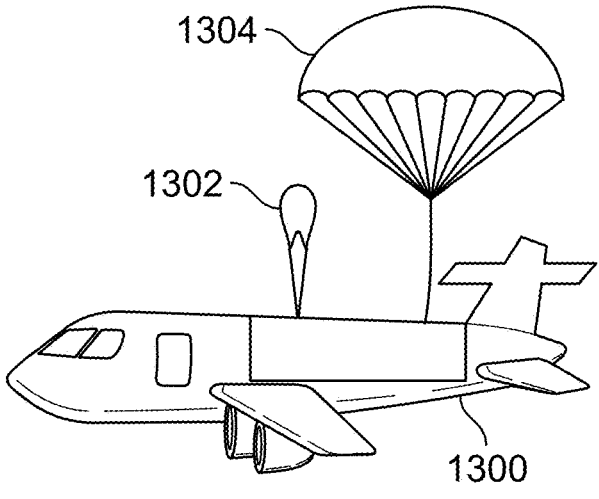
FIG. 13B is a diagram illustrating an embodiment of an aircraft comprising a multimodal aircraft recovery system after deployment of a second parachute.
Figure 13B:
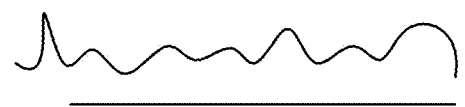

FIG. 13B is a diagram illustrating an embodiment of an aircraft comprising a multimodal aircraft recovery system after deployment of a second parachute. In the example shown, FIG. 13B is a continuation of FIG. 13A in a series of actions performed by the multimodal recovery system. Aircraft 1300 may be traveling at a low speed and a low altitude. Aircraft 1300 may be traveling at a low speed due to the effect of first parachute 1302 initially slowing the aircraft down. Since the deployment of first parachute 1302, the aircraft may have fallen closer to ground. The second parachute may be optimized for a second set of conditions comprising a low speed and a low altitude. The second parachute may be faster to deploy, lighter, or larger than the first parachute. In the example shown, second parachute 1304 is deployed. Second parachute 1304 may be a large parachute that captures a large amount of air, slowing down aircraft 1300 and preparing it for touching down on ground. The large size of second parachute 1304 may allow it to take on a full load of the aircraft. Second parachute 1304 may be thin due to weight restraints due to its size. The thin material of second parachute 1304 may have prevented it from being released initially when the aircraft was experiencing a high speed drop, because the material would easily rip.

In some embodiments, the parachutes has multiple possible states of deployment. For example, a parachute may be deployed with a riser ring such that the parachute cannot instantly inflate. The riser ring may decrease the force the parachute experiences upon deployment. As the aircraft falls, the parachute may slowly fill with air, causing the riser ring to passively retract down the riser. A parachute may be deployed in stages at a high speed in order to slowly increase the load on the parachute and minimize chances of the parachute ripping. Deploying in stages may allow for greater range on a single parachute. The multimodal system may include an option to deploy a parachute in stages.

Figure 14:
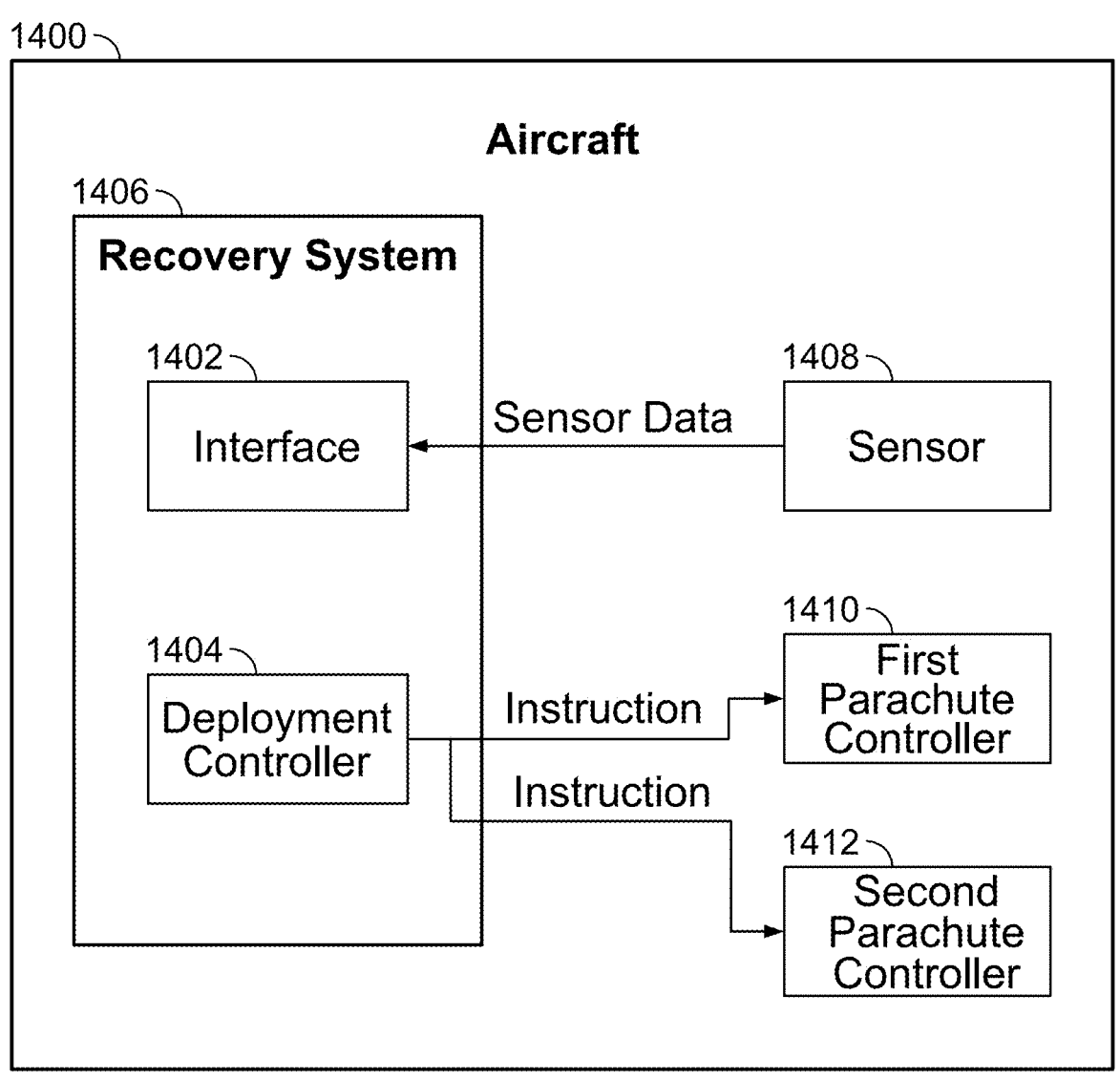
FIG. 14 is a block diagram illustrating an embodiment of a multimodal aircraft recovery system.

FIG. 14 is a block diagram illustrating an embodiment of a multimodal aircraft recovery system. In the example shown, aircraft 1400 includes recovery system 1406, sensor 1408, first parachute controller 1410, and second parachute controller 1412. Recovery system 1406 includes interface 1402 and deployment controller 1404. Sensor 1408 sends sensor data to interface 1402. In some embodiments, the sensor data contains information on a speed or height above ground of the aircraft. The speed may be relative to wind. Deployment controller 1404 may be a processor. Recovery system 1406 may be entirely mechanical. Deployment controller 1404 sends instructions to first parachute controller 1410 and second parachute controller 1412. In the event that deployment controller 1404 determines from sensor data that the aircraft is experiencing a first condition, for example, a high speed and high altitude, deployment controller 1404 may send an instruction to first parachute controller 1410 to deploy the first parachute. One or more parachutes may be deployed simultaneously. The parachutes may be deployed mechanically, automatically, or based on a pilot indication.

Figure 15:
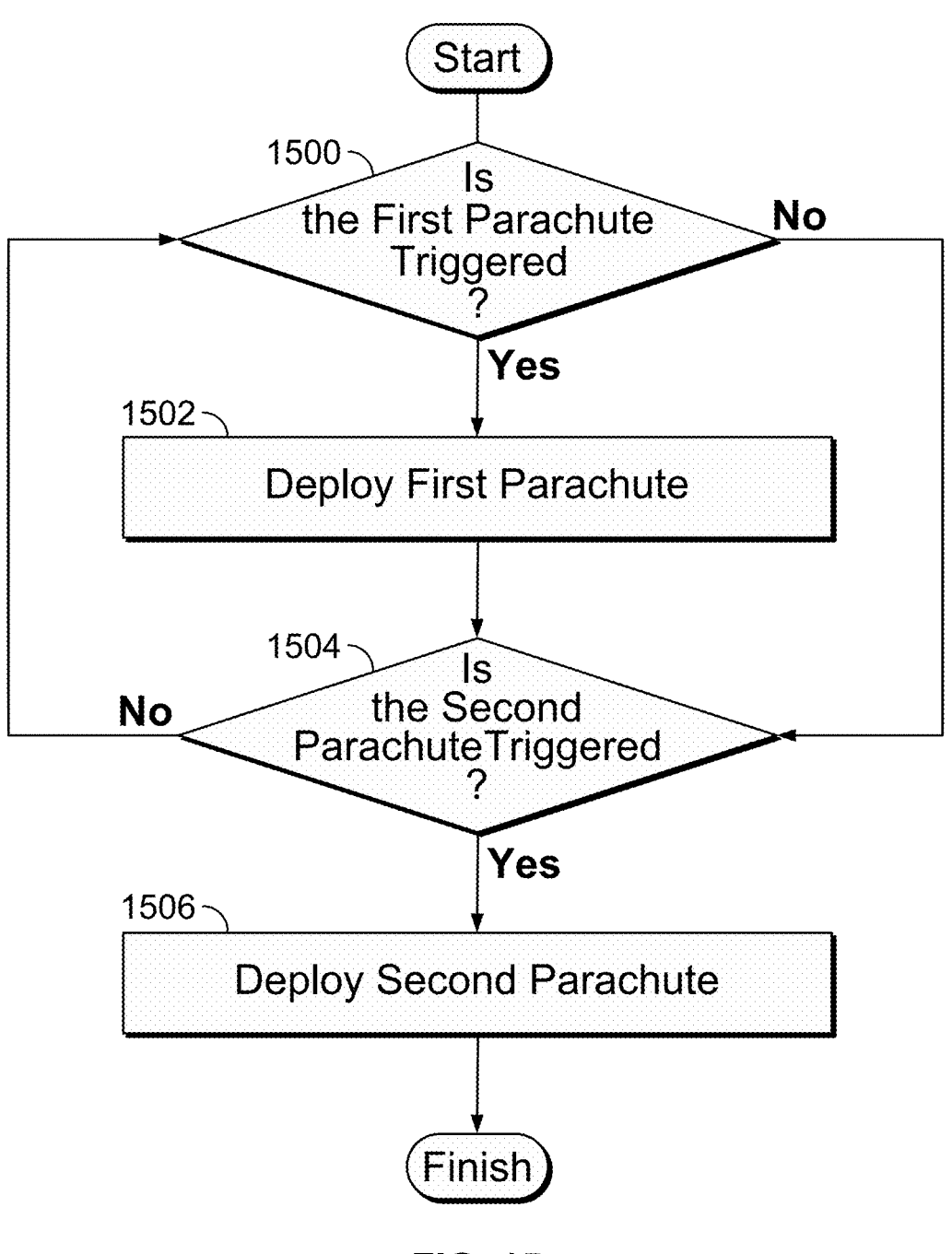
FIG. 15 is a flow diagram illustrating an embodiment of a multimodal aircraft recovery system process.

FIG. 15 is a flow diagram illustrating an embodiment of a multimodal aircraft recovery system process. In 1500, it is determined whether the first parachute is triggered. In the event the first parachute is triggered, the first parachute is deployed in 1502. Following deployment or in the event that the first parachute was not triggered, it is determined whether the second parachute is triggered. In the event that the second parachute is triggered, in 1506 the second parachute is deployed. In the event that the second parachute is not triggered, the process returns to 1500. The parachutes may be triggered via an indication from a human. For example, a pilot may decide which parachute is to be deployed, whether the parachute is to be deployed in stages or not, when the parachute is to be deployed, or any other factors regarding the parachute's deployment. The second parachute may be triggered based on a time delay since the deployment of the first parachute. The parachutes may be triggered mechanically or by a processor.

Figure 16:
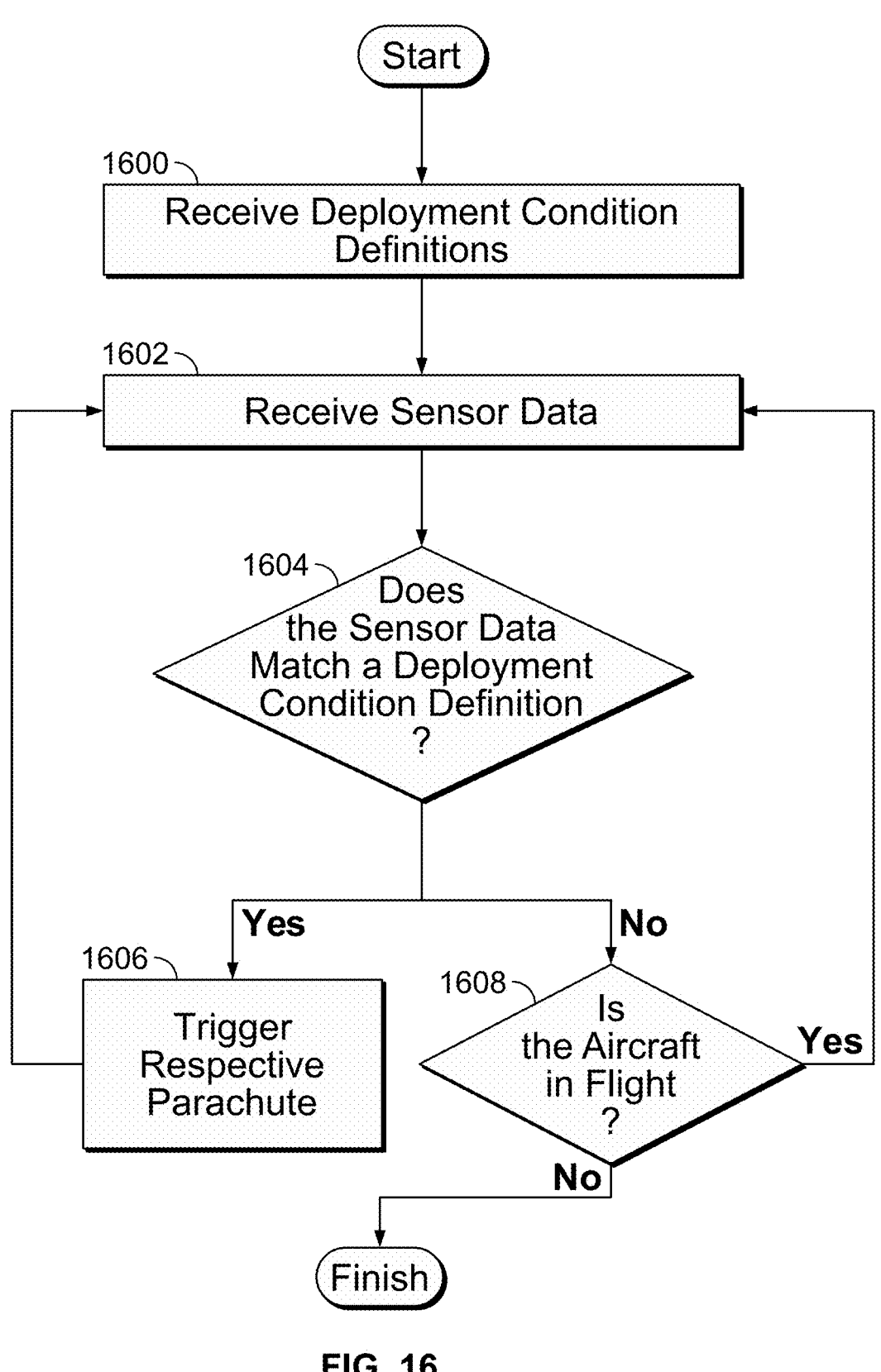
FIG. 16 is a flow diagram illustrating an embodiment of a multimodal aircraft recovery system parachute triggering process.

FIG. 16 is a flow diagram illustrating an embodiment of a multimodal aircraft recovery system parachute triggering process. Parachute deployment may be triggered based on sensor data conveying a condition. In 1600, deployment condition definitions are received. For example, a deployment condition definition may specify that at a predetermined altitude, a certain parachute should be deployed. A deployment condition definition may specify that a parachute deployment should be at a certain state based on a specific condition. A deployment condition definition may be based on an altitude, a speed, an environmental character, or any combination of sensor data. The deployment condition definitions may be stored in a computer memory. The deployment condition definitions may be worked into the mechanics of the system such that the desired deployment is triggered mechanically when the condition is reached. In some embodiments, mechanical triggering of deployment is enacted by a pilot of the aircraft via a mechanical igniter. The pilot may operate a physical pull-cord or handle to trigger deployment. In an automated aircraft recovery system, a processor may use an electrical rocket igniter to trigger the system. In 1602, sensor data is received. In some embodiments, sensor data is received via accelerometers, global positioning systems, odometers, cameras, or any appropriate sensor. In 1604, it is determined whether the sensor data matches a deployment condition definition. In the event that the sensor data does match a deployment condition definition, in 1606 a respective parachute is triggered and the process returns to 1602. In the event that the sensor data does not match a deployment condition definition, in 1608 it is determined whether the aircraft is in flight. In the event that the aircraft is in flight, the process returns to 1602. In the event that the aircraft is not in flight, the process is finished. The multimodal recovery system may continuously check whether sensor data matches a deployment condition definition as long as the aircraft is in flight.

Figure 17:
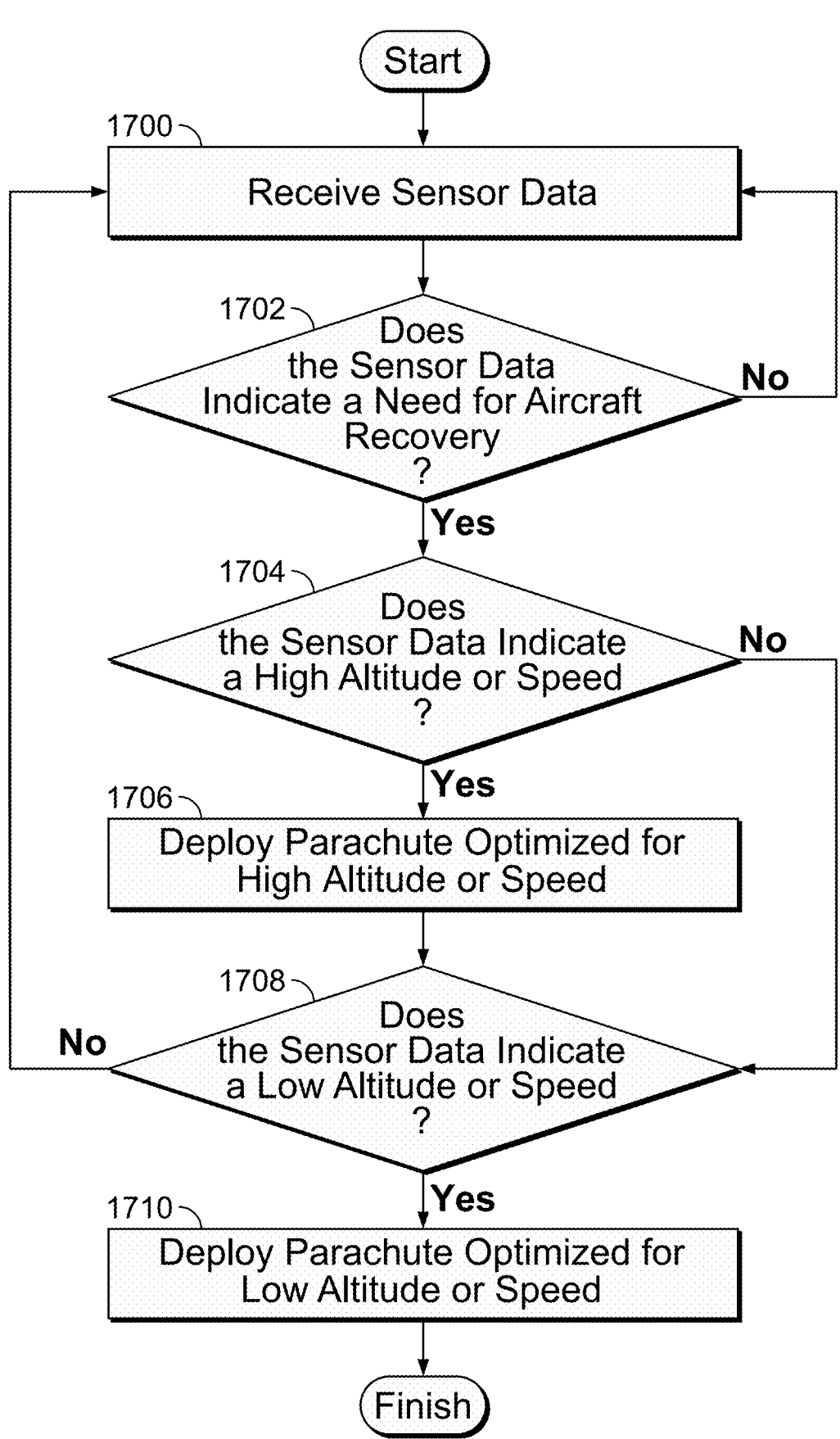
FIG. 17 is a flow diagram illustrating an embodiment of a multimodal aircraft recovery system automatic deployment process.

FIG. 17 is a flow diagram illustrating an embodiment of a multimodal aircraft recovery system automatic deployment process. In some embodiments, aircrafts have many types of parachutes configured for varying conditions. FIG. 17 illustrates an embodiment in which the aircraft is equipped with two types of parachutes. The embodiment may describe an aircraft that is equipped with one or more parachutes optimized for a high altitude or high speed, and one parachute optimized for a low altitude or a low speed.

In 1700, sensor data is received. In 1702, it is determined whether the sensor data indicates a need for aircraft recovery. The need for aircraft recovery may be based on predetermined deployment definitions. The multimodal recovery system may include both manual and automatic modes. In the event that the multimodal recovery system is in manual mode, the indication of a need for aircraft recovery may consist of a designating the system as automatic because the steps following 1702 are automatically carried out by the recovery system. In the event that automatic mode is already established, determining a need for aircraft recovery may be contingent on an expected state of the aircraft. For example, during take-off, the conditions may meet a parachute deployment condition without an indication of a need for aircraft recovery. The need for aircraft recovery may be based on an indication from a pilot. The pilot may press a multimodal recovery system enable or disable switch. The aircraft may have an emergency recovery button for the pilot to press.

In the event that the sensor data does not indicate a need for aircraft recovery, the process returns to 1700. The loop between 1700 and 1702 may continue as long as the aircraft is airborne. In the event that the sensor data indicates a need for aircraft recovery, in 1704 it is determined whether the sensor data indicates a high altitude or speed. In the event that the sensor data indicates a high altitude or speed, in 1706 a parachute optimized for a high altitude or speed is deployed. Following 1706 or in the event that the sensor data did not indicate a high altitude or speed, in 1708 it is determined whether the sensor data indicates a low altitude or speed. In the event that the sensor data does not indicate a low altitude or speed, the process returns to 1700. In the event that the sensor data does indicate a low altitude or speed, in 1710 a parachute optimized for a low altitude or speed is deployed. After the parachute optimized for a low altitude or speed is deployed, the process is finished.

The process may cause a first parachute to be deployed when the sensor data indicates a high altitude or speed, and in the event that the sensor data still indicates a high altitude or speed, an additional parachute optimized for the condition is deployed. When the sensor data indicates a low altitude or speed, the aircraft only has one parachute suited for the condition to deploy and the process is finished.

Figure 18:
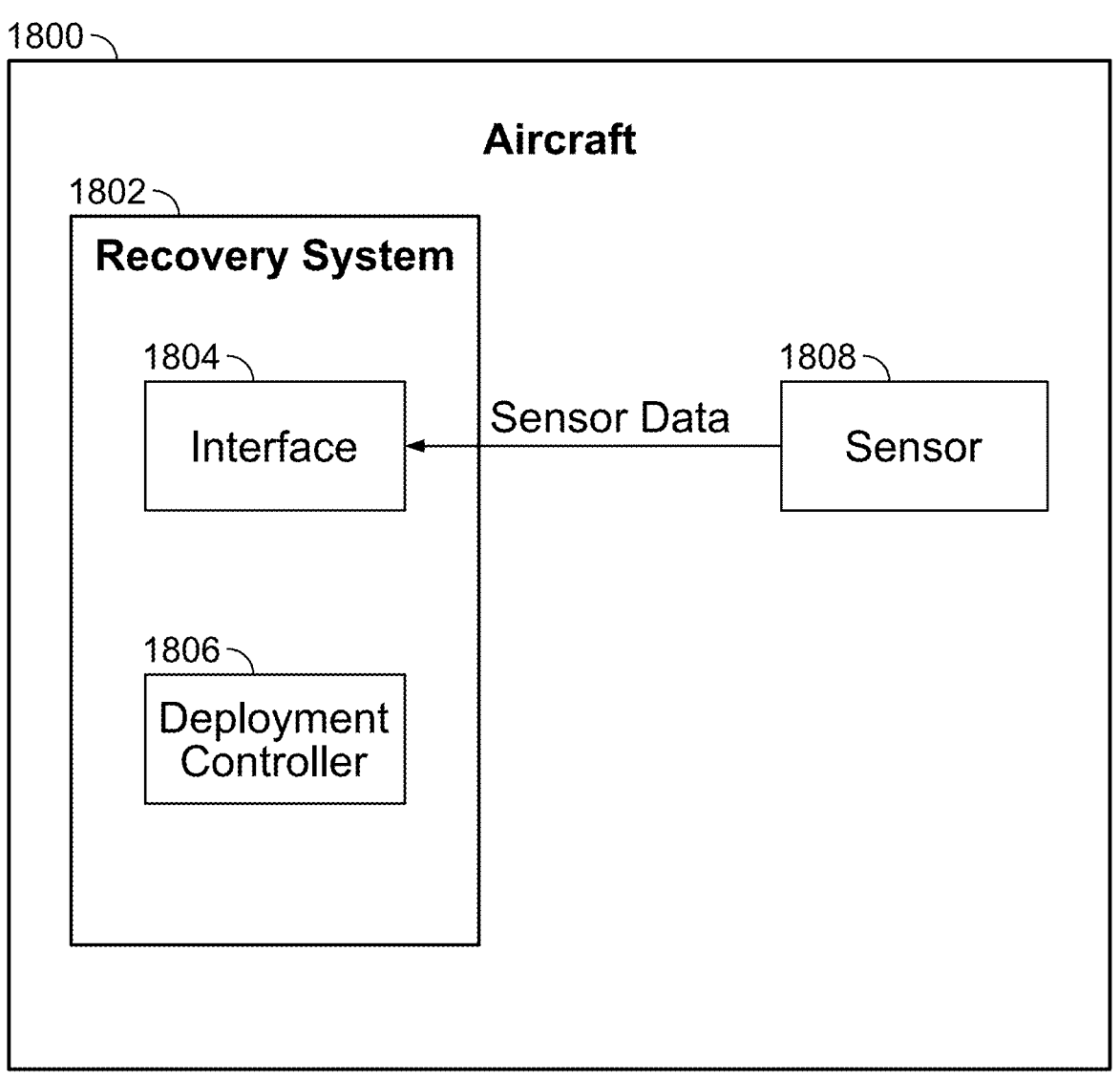
FIG. 18 is a block diagram illustrating an embodiment of an automated aircraft recovery system.

FIG. 18 is a block diagram illustrating an embodiment of an automated aircraft recovery system. An automated aircraft recovery system may automatically determine and enact a series of actions to recover the aircraft. In some embodiments, the series of actions are determined based on sensor data. The series of actions may be determined based on the recovery options available to the aircraft, such as parachutes optimized for various conditions or parachutes of various deployment methods. The automated aircraft recovery system may be used with off-the-shelf parachutes or specialized parachutes. The series of actions may coordinate parachute deployments with flight maneuvers. The series of actions may consider the state of recovery mechanisms in the aircraft. The series of actions may be determined based on environmental obstacles in addition to altitude and speed.

In the example shown, aircraft 1800 includes recovery system 1802 and sensor 1808. Recovery system 1400 includes interface 1804 and deployment controller 1806. Interface 1804 receives sensor data from sensor 1808. In some embodiments, deployment controller 1806 comprises a processor. In some embodiments, deployment controller 1806 is mechanical.

In some embodiments, the sensor data comprises one or more of the following: a speed, an altitude, an attitude, or a flight condition. For example, the sensor data may include the aircraft's trajectory, how fast the aircraft is turning, the aircraft's pitch, or any other appropriate factor related to the aircraft's flight. The sensor data may comprise a functionality, health, or state of a control, an electrical component, or a structural component of an aircraft. For example, the sensor may test an integrity of an electrical signal of the aircraft. The sensor may receive periodic pings or "pulses" from a component of the aircraft, wherein a cease in the signals indicates that the component is malfunctioning. The sensor may sense if a parachute casing is compromised. In some embodiments, sensors are used to determine whether obstacles exist that prevent immediate parachute deployment. Sensors may be used to recognize obstacles such as buildings, trees, or water. Obstacles may be determined based on GPS data.

In some embodiments, the sensor data comprises one or more of the following: global positioning system information, a proximity to an obstacle, an obstacle classification, a communication with another aircraft, or environmental information. Information on the aircraft's surroundings may factor into determining the course of recovery. Determining the recovery action may account for nearby hospitals, schools, sensitive buildings, or no-crash zones. For example, an obstacle may be determined to be a tall tree in an uninhabited forest. The obstacle may be classified as a low level of danger because minimal human harm is expected to be caused by landing into the forest. In the event that an obstacle is determined to be a high risk or forbidden zone such as a hospital, the automated aircraft recovery system may direct the aircraft away from the zone before deploying a parachute. The aircraft may be in communication with other aircrafts around it and use sensor information collected by other aircrafts. In the event that bandwidth or timing of communications are limiting, the system may use the information collected from the latest communication to determine a general idea of where other aircrafts are. For example, the system may extrapolate the other aircrafts' trajectories.

Figure 19A:
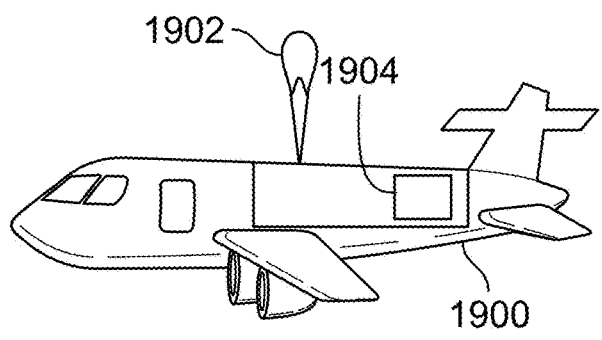
FIG. 19A is a diagram illustrating an embodiment of an aircraft comprising an automated aircraft recovery system after deployment of a first parachute.

FIG. 19A is a diagram illustrating an embodiment of an aircraft comprising an automated aircraft recovery system after deployment of a first parachute. In the example shown, aircraft 1900 has stored parachute 1904. Parachute 1902 has been deployed. In some embodiments, parachute 1902 is a small, heavy-weight, strong parachute. Parachute 1902 may have been deployed in response to high altitude, high speed conditions.

Figure 19B:
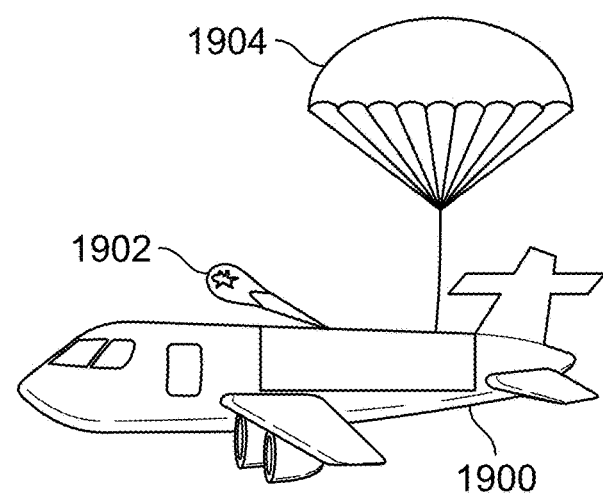
FIG. 19B is a diagram illustrating an embodiment of an aircraft comprising an automated aircraft recovery system after deployment of a second parachute.

FIG. 19B is a diagram illustrating an embodiment of an aircraft comprising an automated aircraft recovery system after deployment of a second parachute. In the example shown, parachute 1902 has developed a rip in its canopy. The rip may have occurred due to experiencing a fall speed greater than the parachute could handle. The rip may have occurred due to the weight of the aircraft. As a result, parachute 1902 is collapsed and is not aiding in slowing the fall of aircraft 1900. In some embodiments, the automated aircraft recovery system senses that parachute 1902 has been compromised. For example, the aircraft may have an accelerometer that determines the aircraft is falling faster than expected. In response, the automated aircraft recovery system may deploy parachute 1904. Parachute 1904 may not be optimized for the environmental conditions aircraft 1900 is experiencing, but the collapse of parachute 1902 created a need for a parachute to be deployed.

Figure 19C:
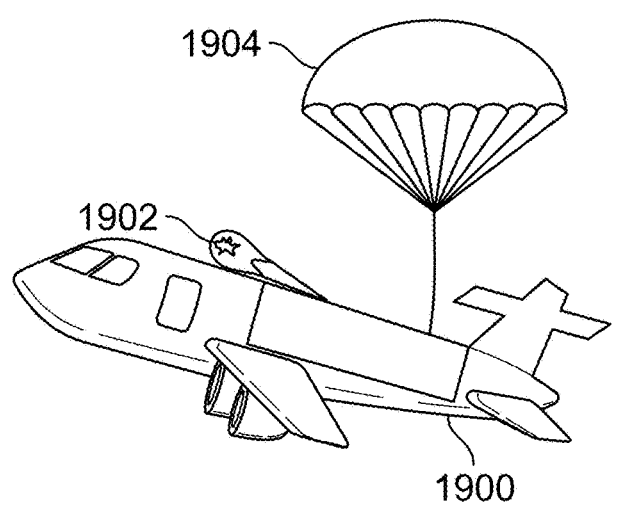
FIG. 19C is a diagram illustrating an embodiment of an aircraft comprising an automated aircraft recovery system after an aircraft maneuver.

FIG. 19C is a diagram illustrating an embodiment of an aircraft comprising an automated aircraft recovery system after an aircraft maneuver. In the example shown, parachute 1902 remains collapsed and parachute 1904 is filled with air. In the example shown, aircraft 1900 is flying in a nose up configuration. Flying in a nose up configuration may increase lift of the aircraft, causing a load on parachute 1904 to be lessened. Flying in a nose up configuration may decrease the chance that parachute 1904 will rip, which may be critical because parachute 1902 is torn. In some embodiments, the automated aircraft recovery system recalculates steps in the series of actions as the actions are taken in order to account for unexpected changes, such as a collapsed parachute, a malfunctioning part, a change in weather, or any other appropriate change. In the example shown, the recovery step comprises deploying parachute 1904 while navigating the aircraft to a new position. In some embodiments, the recovery action comprises changing a flight path of an aircraft to compensate for a limitation of a parachute of the aircraft. For example, a parachute may have suspension lines that catch easily on branches of trees. The recovery system may determine the parachute cannot be deployed until the aircraft is maneuvered away from a risky environment.

In some embodiments, the automated aircraft recovery system utilizes a multimodal recovery system. The various parachutes optimized for various conditions of the multimodal recovery system as utilized and automatically deployed by the automated aircraft recovery system.

Figure 20A:
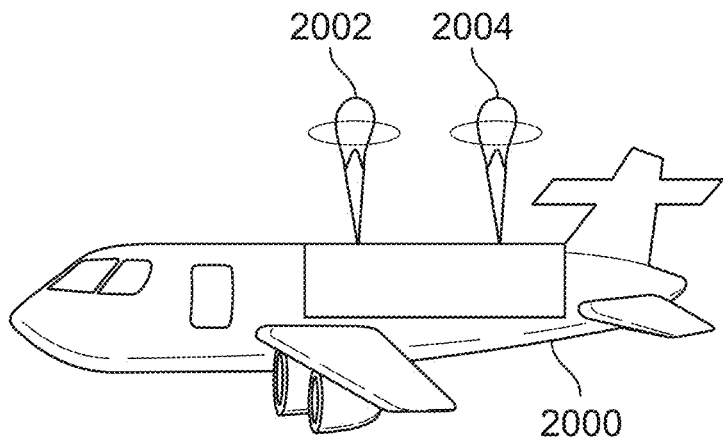
FIG. 20A is a diagram illustrating an embodiment of an aircraft comprising an automated aircraft recovery system after deployment of parachutes with riser rings.

FIG. 20A is a diagram illustrating an embodiment of an aircraft comprising an automated aircraft recovery system after deployment of parachutes with riser rings. In the example shown, aircraft 2000 is caught by parachute 2002 and parachute 2004. Parachute 2002 and parachute 2004 have been deployed with riser rings. The riser rings prevent the parachutes from fully inflating upon deployment. In some embodiments, the parachutes are deployed with riser rings to protect the parachutes from a sudden large load upon deployment.

Figure 20B:
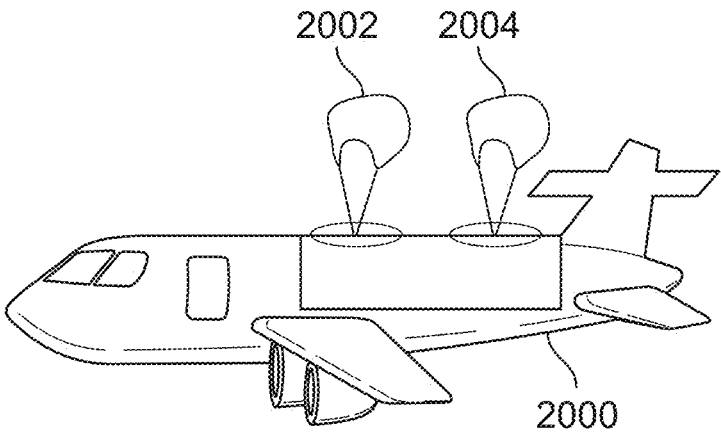
FIG. 20B is a diagram illustrating an embodiment of an aircraft comprising an automated aircraft recovery system with fully inflated parachutes.

FIG. 20B is a diagram illustrating an embodiment of an aircraft comprising an automated aircraft recovery system with fully inflated parachutes. In the example shown, parachute 2002 and parachute 2004 are fully inflated. As the parachutes filled with air, the riser rings may have been pushed down on aircraft 2000. In some embodiments, parachutes with riser rings are deployed in the event that an aircraft requires recovery while it is flying at a high altitude above ground and is falling or flying at a high speed. Deploying parachutes with riser rings may artificially strengthen the parachute initially while allowing the parachute to catch its full capacity of air after the ring drops down.

Figure 20C:
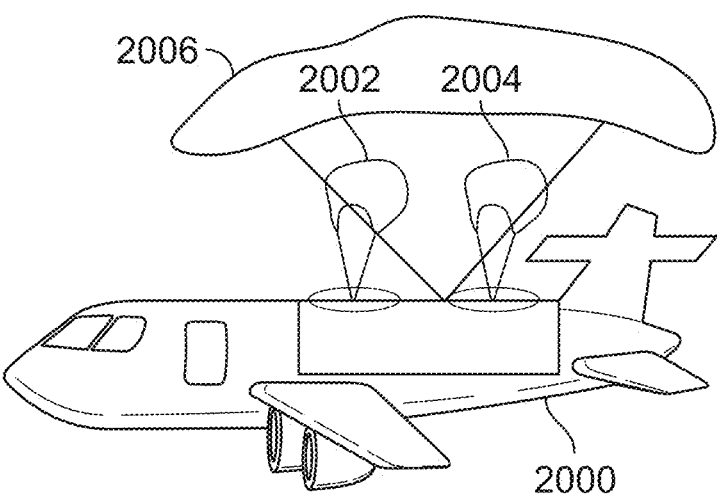
FIG. 20C is a diagram illustrating an embodiment of an aircraft comprising an automated aircraft recovery system after deployment of an additional parachute.

FIG. 20C is a diagram illustrating an embodiment of an aircraft comprising an automated aircraft recovery system after deployment of an additional parachute. In the example shown, parachute 2002 and parachute 2004 are filled with air. Parachute 2006 has been deployed from aircraft 2000. In some embodiments, parachute 2006 is a parachute optimized for low altitude or low speed conditions. Parachute 2006 may be lightweight and have a larger diameter than parachute 2002 and parachute 2004. In some embodiments, the automated aircraft recovery system monitored the condition of aircraft 2000, and as appropriate for the situation, deployed various parachutes.

Figure 21A:
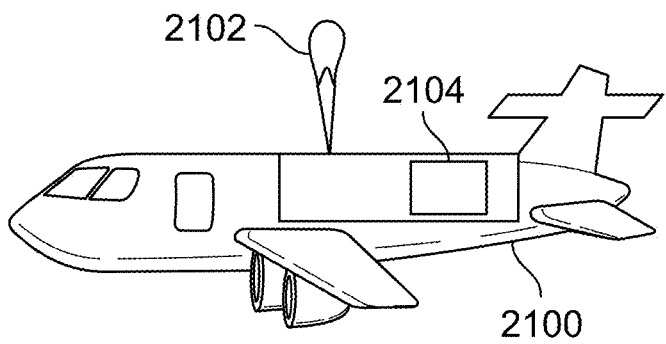
FIG. 21A is a diagram illustrating an embodiment of an aircraft comprising an automated aircraft recovery system after deployment of a first parachute.

FIG. 21A is a diagram illustrating an embodiment of an aircraft comprising an automated aircraft recovery system after deployment of a first parachute. In some embodiments, the automated aircraft recovery system considers recovery mechanisms, components, or systems available to it. In the example shown, aircraft 2100 has stored parachute 2104. Parachute 2102 is deployed. In some embodiments, parachute 2102 is meant for an initial slowing down of the aircraft but is not configured to slow the aircraft to a speed slow enough for landing.

Figure 21B:
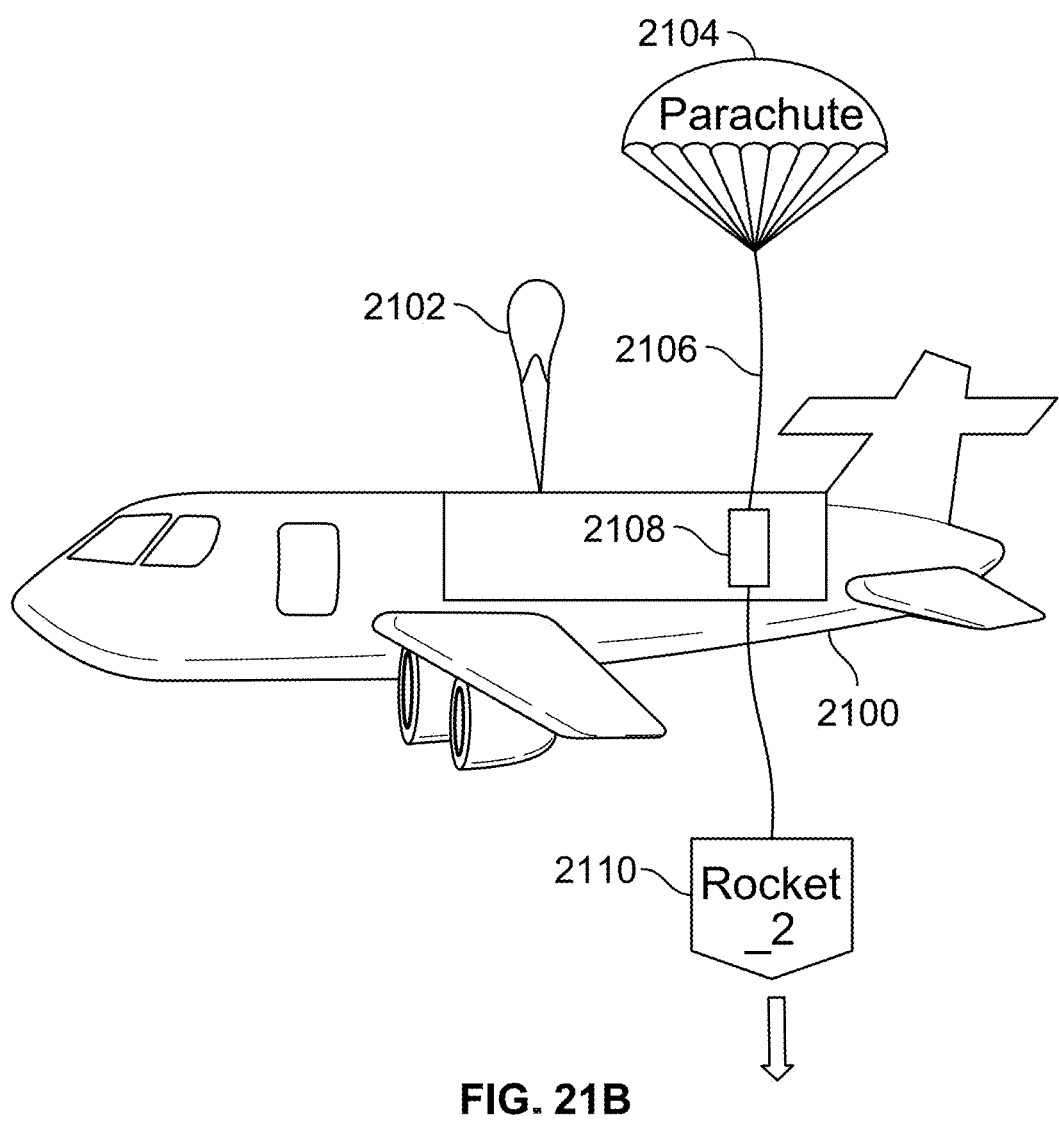
FIG. 21B is a diagram illustrating an embodiment of an aircraft comprising an automated aircraft recovery system after deployment of a second parachute via a multi-rocket parachute deployment system.

FIG. 21B is a diagram illustrating an embodiment of an aircraft comprising an automated aircraft recovery system after deployment of a second parachute via a multi-rocket parachute deployment system. In the example shown, parachute 2102 is filled with air. Parachute 2104 may be deployed using a multi-rocket parachute deployment system. In the example shown, rocket_2 2110 pulls riser 2106 through aircraft 2100. Cam cleat 2108 prevents riser 2106 from being pulled back up towards parachute 2104. In some embodiments, an obstacle such as a flock of birds prevented parachute 2104 from being deployed at a higher altitude above ground. The automated recovery system may have determined to deploy parachute 2104 at a low altitude because the use of rocket_2 2110 allows parachute 2104 to be filled with air rapidly. In some embodiments, a parachute may be configured to have a choice of deployment methods. In some embodiments, a parachute has only one predetermined method of deployment.

Figure 22:
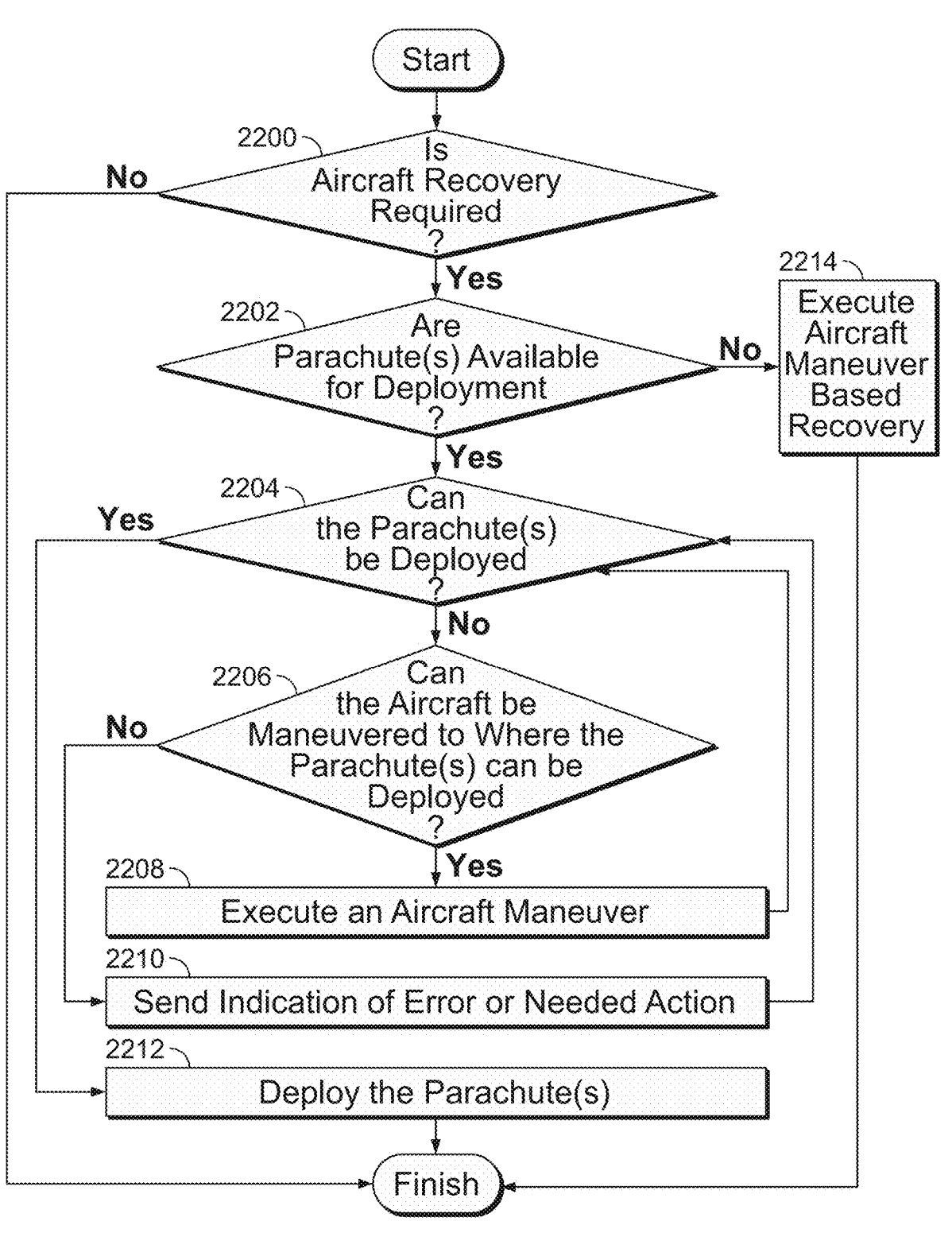
FIG. 22 is a flow diagram illustrating an embodiment of an automated aircraft recovery system process.

FIG. 22 is a flow diagram illustrating an embodiment of an automated aircraft recovery system process. In some embodiments, the system comprises an enabled mode and a disabled mode. For example, a pilot may disable the automated aircraft recovery system in the event the aircraft is being used to perform stunts. The flow of FIG. 22 may not be followed in the event that the pilot has disabled the system.

In 2200, it is determined whether aircraft recovery is required. In some embodiments, determining whether aircraft recovery is required is carried out by a process described in FIG. 23. In the event that aircraft recovery is not required, the process is finished. In some embodiments, in the event that aircraft recovery is not required, the system continues to check whether it is required based on a predetermined time interval. In the event that aircraft recovery is required, in 2202 it is determined whether parachute(s) are available for deployment. For example, the system may determine whether the one or more parachutes are in good condition. In some embodiments, the parachutes may be required to be replaced regularly (e.g. every few years). In some embodiments, the system may check the last time the parachutes were replaced or the last time a maintenance check was performed on the parachutes in order to determine whether the parachutes are available for deployment. In some embodiments, the system checks that a parachute is in working order or its deployment mechanism is in working order. In the event that parachute(s) are not available for deployment, in 2214 aircraft maneuver based recovery is executed and the process is finished. In some embodiments, aircraft maneuver based recovery comprises changing the flight path of the aircraft in order to recover the aircraft. For example, the aircraft may be flown out to a body of water where it is able to land safely without any parachutes. The aircraft may enter a steep climb in order to avoid crashing into ground.

In the event that parachute(s) are available for deployment, in 2204 it is determined whether the parachute(s) can be deployed. In some embodiments, the process to determine whether the parachute(s) can be deployed is described in FIG. 24. In the event that the parachute(s) can be deployed, in 2212 the parachute(s) are deployed and the process is finished. In the event that the parachute(s) cannot be deployed, in 2206 it is determined whether the aircraft can be maneuvered to where the parachute(s) can be deployed. In the event that they can be maneuvered to where the parachute(s) can be deployed, in 2208 an aircraft maneuver is executed and the process returns to 2204.

In the event that the aircraft cannot be maneuvered to where the parachute(s) can be deployed, an indication of error or needed action is sent in 2210. In some embodiments, the system provides instruction to a pilot of an aircraft. For example, the pilot may receive a message that the automated aircraft recovery system is unable to stabilize flight. The pilot may manually stabilize the aircraft, causing the aircraft to reach a position that the automated aircraft recovery system is able to continue recovery efforts. The automated aircraft recovery system may not be able to carry out a highly complex aircraft maneuver without manual input from a pilot. After sending the indication of error or needed action in 2210, the system determines whether the parachute(s) can be deployed in 2204. In some embodiments, the pilot's actions corrected the error and the parachute(s) are able to be deployed or the automated aircraft recovery system is able to maneuver to where the parachute(s) can be deployed.

Figure 23:
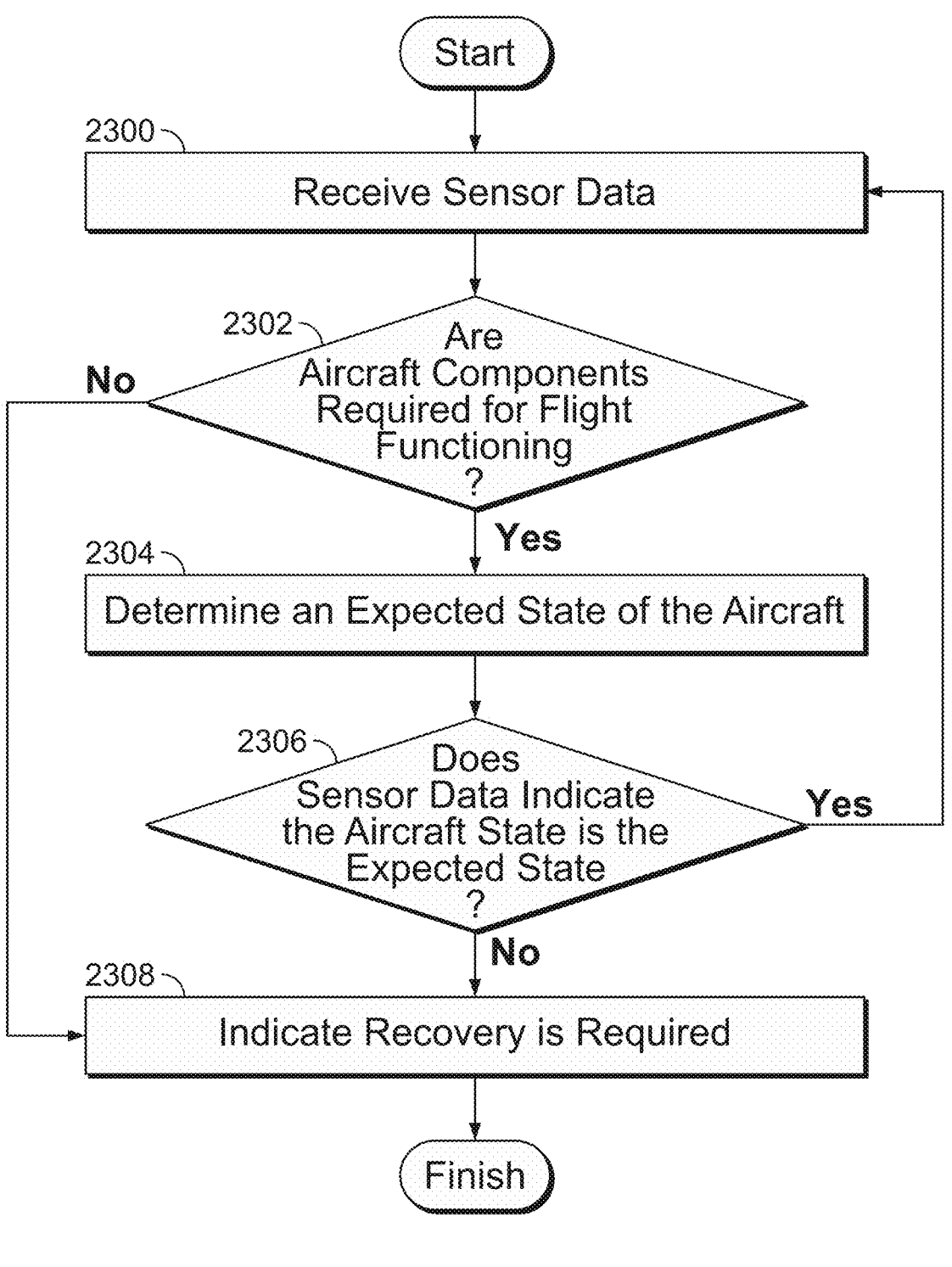
FIG. 23 is a flow diagram illustrating an embodiment of an automated aircraft recovery system recovery need determination process.

FIG. 23 is a flow diagram illustrating an embodiment of an automated aircraft recovery system recovery need determination process. In some embodiments, the control mechanism of the automated aircraft recovery system determines an expected state of an aircraft, determines whether a state of the aircraft matches the expected state, and in the event the state of the aircraft does not match the expected state, performs the recovery action. The time that passes between a moment of emergency to when the aircraft is fully caught by the parachute may be critical in recovering the aircraft. In some typical recovery systems, waiting for a human indication to trigger recovery takes roughly half of the time between the moment of emergency and when the aircraft is fully caught. In some embodiments, the automated aircraft recovery system increases chances of aircraft recover by automatically recognizing the need for recovery and determining an optimal mode of action. In some typical recovery systems, a human may choose to perform a recovery action that is not optimal based on the conditions, causing the aircraft to become unrecoverable.

In 2300, sensor data is received. In 2302, it is determined whether aircraft components required for flight are functioning. For example, the system may perform a check on structural, electrical, mechanical, or any appropriate component of the aircraft. The system may recognize a lack of a repeated signal intended to be received from a component. In the event that aircraft components required for flight are not functioning, in 2308 it is indicated that recovery is required and the process is finished. In some embodiments, having a component that is critical to flight malfunctioning causes a need to trigger a series of emergency recovery actions.

In the event that the components are functioning, in 2304 an expected state of the aircraft is determined. In 2306, it is determined whether sensor data indicates the aircraft state is the expected state. For example, experiencing a steep climb is expected in the event of a take-off but is cause for an emergency response if it occurs in the middle of the flight. In the event that the aircraft state is not the expected state, in 2308 it is indicated that recovery is required and the process is finished. In the event that the aircraft state is the expected state, the process returns to 2300. In some embodiments, the process of FIG. 23 is carried out as long as the aircraft remains airborne.

Figure 24:
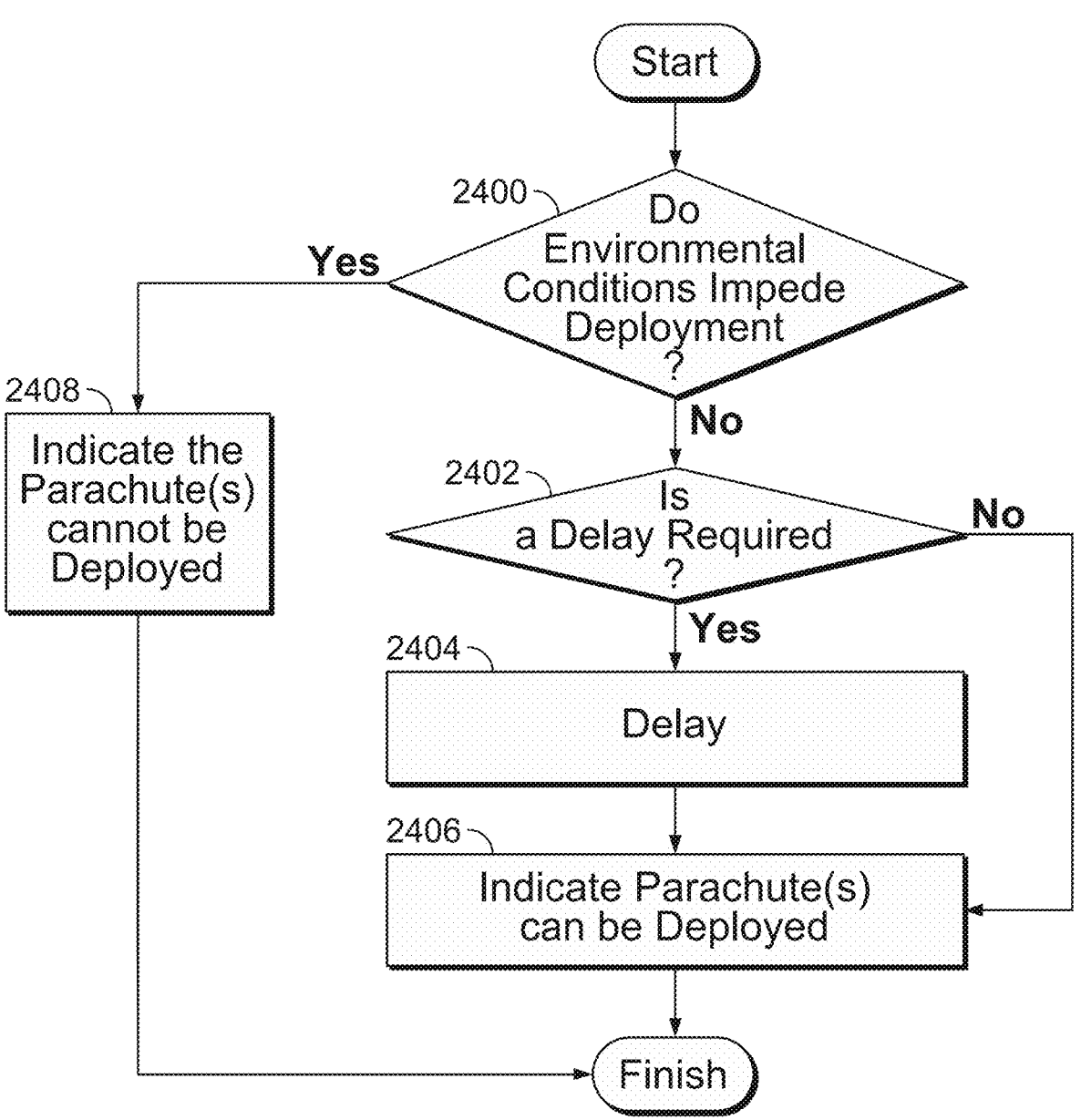
FIG. 24 is a flow diagram illustrating an embodiment of an automated aircraft recovery system parachute deployment determination process.

FIG. 24 is a flow diagram illustrating an embodiment of an automated aircraft recovery system parachute deployment determination process. The process may determine whether a parachute can be deployed. In 2400, it is determined whether environmental conditions impede deployment. In the event that environmental conditions impede deployment, in 2408 it is indicated that the parachute(s) cannot be deployed. This information may be used by the system to maneuver the aircraft to a better position. In the event that environment conditions do not impede deployment, in 2402 it is determined whether a delay is required. In some embodiments, no obstacles are in the path of the aircraft, but it is preferred to launch the parachute when the aircraft is closer to the ground. For example, launching the parachute high may result in the aircraft landing far from where it is desired to land. In the event that a delay is required, in 2404 the system delays and the process continues to 2406. In the event a delay is not required, the process continues to 2406. In 2406, it is indicated that parachute(s) can be deployed and the process is finished.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first parachute canopy;
a second parachute canopy, wherein the first parachute canopy and the second parachute canopy are coupled to an aircraft at a point aft of a center of mass of the aircraft; and
a processor configured to:
  output an indication to perform a recovery action, including by deploying the first parachute canopy and the second parachute canopy;
  receive sensor data from a sensor, wherein the sensor data includes parachute canopy state information associated with the first parachute canopy and the second parachute canopy;
  determine, based at least in part on the sensor data, whether to generate a control signal with a value associated with maneuvering the aircraft into a nose-up position, wherein:
    in the event the parachute canopy state information indicates the first parachute canopy is collapsed and the second parachute canopy is inflated, the control signal is generated with the value associated with maneuvering the aircraft into the nose-up position; and a load on the second parachute canopy is reduced in the event the aircraft is in the nose-up position compared to the aircraft being in a nose-down position; and
  output the control signal.

2. The system of claim 1, wherein:
the first parachute canopy is deployed before the second parachute canopy; and
the first parachute canopy is smaller than the second parachute canopy.

3. The system of claim 1, wherein:
the first parachute canopy is deployed before the second parachute canopy; and
the first parachute canopy is made of a thicker material than the second parachute canopy.

4. The system of claim 1, wherein:
the first parachute canopy is deployed before the second parachute canopy; and
the first parachute canopy is able to withstand a greater load than the second parachute canopy.

5. The system of claim 1, wherein:
the first parachute canopy is deployed before the second parachute canopy; and
the second parachute canopy is able to deploy faster than the first parachute canopy.

6. The system of claim 1, wherein:
the sensor data further includes an aircraft altitude and an aircraft speed; and
the processor is further configured to determine the recovery action based at least in part on the aircraft altitude and the aircraft speed.

7. The system of claim 1, wherein:
the sensor data further includes an aircraft altitude and an aircraft speed; and
the processor is further configured to determine the recovery action, including whether to deploy the first parachute canopy or the second parachute canopy first, based at least in part on the aircraft altitude and the aircraft speed.

8. A method, comprising:
outputting an indication to perform a recovery action, including by deploying a first parachute canopy and a second parachute canopy, wherein the first parachute canopy and the second parachute canopy are coupled to an aircraft at a point aft of a center of mass of the aircraft;
receiving sensor data from a sensor, wherein the sensor data includes parachute canopy state information associated with the first parachute canopy and the second parachute canopy;
determining, based at least in part on the sensor data, whether to generate a control signal with a value associated with maneuvering the aircraft into a nose-up position, wherein:
  in the event the parachute canopy state information indicates the first parachute canopy is collapsed and the second parachute canopy is inflated, the control signal is generated with the value associated with maneuvering the aircraft into the nose-up position; and
  a load on the second parachute canopy is reduced in the event the aircraft is in the nose-up position compared to the aircraft being in a nose-down position; and
outputting the control signal.

9. The method of claim 8, wherein:
the first parachute canopy is deployed before the second parachute canopy; and the first parachute canopy is smaller than the second parachute canopy.

10. The method of claim 8, wherein:

the first parachute canopy is deployed before the second parachute canopy; and the first parachute canopy is made of a thicker material than the second parachute canopy.

11. The method of claim 8, wherein:

the first parachute canopy is deployed before the second parachute canopy; and the first parachute canopy is able to withstand a greater load than the second parachute canopy.

12. The method of claim 8, wherein:

the first parachute canopy is deployed before the second parachute canopy; and the second parachute canopy is able to deploy faster than the first parachute canopy.

13. The method of claim 8, wherein:

the sensor data further includes an aircraft altitude and an aircraft speed; and the method further includes determining the recovery action based at least in part on the aircraft altitude and the aircraft speed.

14. The method of claim 8, wherein:

the sensor data further includes an aircraft altitude and an aircraft speed; and the method further includes determining the recovery action, including whether to deploy the first parachute canopy or the second parachute canopy first, based at least in part on the aircraft altitude and the aircraft speed.

* * * * *